United States Patent
Evans et al.

(10) Patent No.: US 9,274,951 B2
(45) Date of Patent: Mar. 1, 2016

(54) CACHE MEMORY CONTROLLER FOR ACCELERATED DATA TRANSFER

(71) Applicant: Altera Corporation, San Jose, CA (US)

(72) Inventors: Allan M Evans, Cupertino, CA (US); Curtis M Williams, Santa Clara, CA (US)

(73) Assignee: Altera Corporation, San Jose, CA (US)

(*) Notice: Subject to any disclaimer, the term of this patent is extended or adjusted under 35 U.S.C. 154(b) by 197 days.

(21) Appl. No.: 13/907,745

(22) Filed: May 31, 2013

(65) Prior Publication Data

US 2014/0359219 A1    Dec. 4, 2014

(51) Int. Cl.
*G06F 12/08* (2006.01)
*G06F 12/02* (2006.01)

(52) U.S. Cl.
CPC .......... *G06F 12/0802* (2013.01); *G06F 12/023* (2013.01); *G06F 2212/401* (2013.01)

(58) Field of Classification Search
None
See application file for complete search history.

(56) References Cited

U.S. PATENT DOCUMENTS

| | | | |
|---|---|---|---|
| 6,349,372 B1* | 2/2002 | Benveniste et al. | 711/159 |
| 6,457,104 B1* | 9/2002 | Tremaine et al. | 711/133 |
| 2008/0293449 A1* | 11/2008 | Barlow et al. | 455/556.1 |
| 2011/0078222 A1* | 3/2011 | Wegener | 708/203 |
| 2011/0099295 A1 | 4/2011 | Wegener | |
| 2012/0221795 A1* | 8/2012 | Hoshaku et al. | 711/130 |
| 2013/0007076 A1 | 1/2013 | Wegener | |
| 2013/0188065 A1 | 7/2013 | Wegener | |
| 2013/0262538 A1 | 10/2013 | Wegener | |
| 2013/0262539 A1 | 10/2013 | Wegener | |

OTHER PUBLICATIONS

"Translation lookaside buffer" https://en.wikipedia.com/wiki/Translation_lookaside_buffer as archived by www.archive.org on Apr. 6, 2012.*

* cited by examiner

*Primary Examiner* — Daniel Tsui
(74) *Attorney, Agent, or Firm* — Okamoto & Benedicto LLP

(57) ABSTRACT

A cache memory controller in a computer system, such as a multicore processing system, provides compression for writes to memory, such as an off-chip memory, and decompression after reads from memory. Application accelerator processors in the system generate application data and requests to read/write the data from/to memory. The cache memory controller uses information relating location parameters of buffers allocated for application data and sets parameters to configure compression and decompression operations. The cache memory controller monitors memory addresses specified in read requests and write requests from/to the first memory. The requested memory address is compared to the location parameters for the allocated buffers to select the set of parameters for the particular application data. Compression or decompression is applied to the application data in accordance with the selected set of parameters. The data size of the data transferred to/from memory is reduced.

27 Claims, 12 Drawing Sheets

CACHE MEMORY CONTROLLER FOR ACCELERATED DATA TRANSFER

BACKGROUND

1. Field of the Invention

The present invention relates to computer system operations, in particular a cache memory controller and associated software driver modules to accelerate data transfers between an on-chip cache and a memory.

2. Description of Related Art

In some computer systems, including multicore processors systems, various application accelerator processors or application accelerator processor cores are specialized for particular computationally intensive applications. Examples include video codec processors to perform video compression and decompression operations in real time, image sensor processors to perform compression or processing of image sensor data, and display processors to format image data for display on a display device. The computations for these applications may require reads and writes of large amounts data between on-chip cache memory and off-chip DRAM (dynamic random access memory). The data transfer bandwidth may present a major bottleneck, particularly for real time applications such as video. Memory is generally organized hierarchically. The memory hierarchy can include a relatively small first level (L1) cache memory and a larger second level (L2) cache memory on the same integrated circuit as the processor core circuitry, along with off-chip, large scale memory implemented often using DRAM. In some configurations, a third level (L3) cache can be included on-chip. Other memory can be used for sharing data among processor cores, such as shared cache memory and message-passing memory. Additional memory in the hierarchy can include persistent stores, such as flash memory, magnetic disk drive memory, network-attached storage and so on. Given the variety of memory technologies, the organization of memory systems is very diverse.

There are many varieties of computer system architectures, each of which can include different memory system configurations. The co-owned and co-pending U.S. patent application Ser. No. 12/891,312, entitled "Enhanced Multi-Processor Waveform Data Exchange Using Compression and Decompression," filed 27 Sep. 2010 (US 2011/0078222), which is incorporated by reference as if fully set forth herein, describes several computer system architectures, and demonstrates the variety architectures and memory configurations. The commonly owned non-provisional patent application Ser. No. 13/534,330 (the '330 application), filed Jun. 27, 2012, entitled "Computationally Efficient Compression of Floating-Point Data," incorporated herein by reference, describes several embodiments for compression floating-point data by processing the exponent values and the mantissa values of the floating-point format. The commonly owned non-provisional patent application Ser. No. 13/617,061 (the '061 application), filed Sep. 14, 2012, entitled "Conversion and Compression of Floating-Point and Integer Data," by Wegener, incorporated herein by reference, describes algorithms for converting floating-point data to integer data and compression of the integer data. The commonly owned non-provisional patent application Ser. No. 12/605,245 (the '245 application), entitled "Block Floating Point Compression of Signal Data," incorporated herein by reference, publication number 2011-0099295, published Apr. 28, 2011, describes efficient bit packing for integer samples. The commonly owned non-provisional patent application Ser. No. 13/358, 511 (the '511 application), filed Jan. 25, 2012, entitled "Raw Format Image Data Processing," incorporated herein by reference, describes compression of raw format image data at least as fast as the image data rate. The commonly owned patent application Ser. No. 13/617,205 (the '205 application), filed Sep. 14, 2012, entitled "Data Compression for Direct Memory Access Transfers," by Wegener, incorporated herein by reference, describes providing compression for direct memory access (DMA) transfers of data and parameters for compression via a DMA descriptor.

As processor performance has improved, processors are executing programs over larger and larger data sets. Also, one processor or group of processors may concurrently execute many programs, each of which requires access to different sizes and types of data sets. For example, broad varieties of application programs acquire, collect, process, and display numerical data. Numerical data includes a variety of data types, such as integers, floating-point numbers, image data, video data, and graphics objects. Numerical data can be accumulated in large files, or acquired at high speeds, and movement of such data among elements of processor system memory hierarchies can cause bottlenecks in system performance.

Thus, the amount of memory available, in terms of the number of bytes, at each element of a memory system for a given computer system, and the bandwidth of the data channels among the elements of the memory system, can limit the efficiency and speed with which a given program can be executed. Given the variant computer systems architectures and variant memory system configurations, the control of data flow among the memory elements is often implemented in a platform-specific manner. This platform-specific memory management interferes with users' ability to individually manage data flow to improve the efficiency of accessing memory resources in a given computer system.

It is desirable to provide technologies that increase the effective bandwidth for data transfers between on-chip and off-chip components of the memory system in computer systems in a manner that is transparent to the application program.

SUMMARY

The technology described herein provides methods and apparatus, including computer program products, for a cache memory controller providing compression for writes to memory, such as an off-chip memory, and decompression after reads from memory. The data size of the data transferred to/from memory is reduced. Advantages of reducing the data size include efficient utilization of the memory bandwidth capacity, reduced latency and improved system performance.

In one aspect, a computer system, such as a multicore processing system, comprises one or more application accelerator processors, a central processing unit (CPU), a cache memory controller and a memory. The cache memory controller includes an encoder to compress application data from the application accelerator processors for writes to the memory and a decoder to decompress compressed application data read from the memory. To support processing by an application program, the CPU will allocate buffers in the memory to store the application data provided by the application accelerator processors. The CPU provides location parameters for the allocated buffers to the cache memory controller. The cache memory controller monitors memory addresses specified in read requests and write requests from/ to the first memory. The cache memory controller selects parameters for the encoder and decoder based on the specified memory addresses and the location parameters. The encoder compresses the application data in accordance with the parameters to form compressed application data for writes to the buffer in memory. The decoder decompresses compressed application data retrieved from the buffer in memory.

In another aspect, there is provided a method including allocating one or more buffers in memory to store application data provided by one or more application accelerator processors, receiving the location parameters for the allocated buffers and a set of parameters associated with the location parameters at a cache memory controller. At the cache memory controller the method further includes monitoring memory addresses specified by the application accelerator processors in respective read requests and write requests from/to the memory, selecting one or more of the parameters based on the specified memory addresses and the location parameters in response to the respective read requests and write requests, compressing the application data in response to a write request or decompressing compressed application data retrieved from memory in response to a read request. The compressing and decompressing are performed in accordance with the selected parameters.

A configuration module in the accelerator driver software includes descriptors containing information including parameters for the encoder and decoder to be applied to the application data generated by the application accelerator processor. The CPU responds to instructions in the configuration module to provide the descriptors and the location parameters for the buffer to the cache memory controller. The cache memory controller uses the location parameters and the requested memory address to select the appropriate descriptor to configure the encoder or decoder. The interaction between the accelerator driver's configuration module and the cache memory controller enables the compression and decompression to be independent, without modification of user application programs or the operating system.

DETAILED DESCRIPTION

Figure 1:
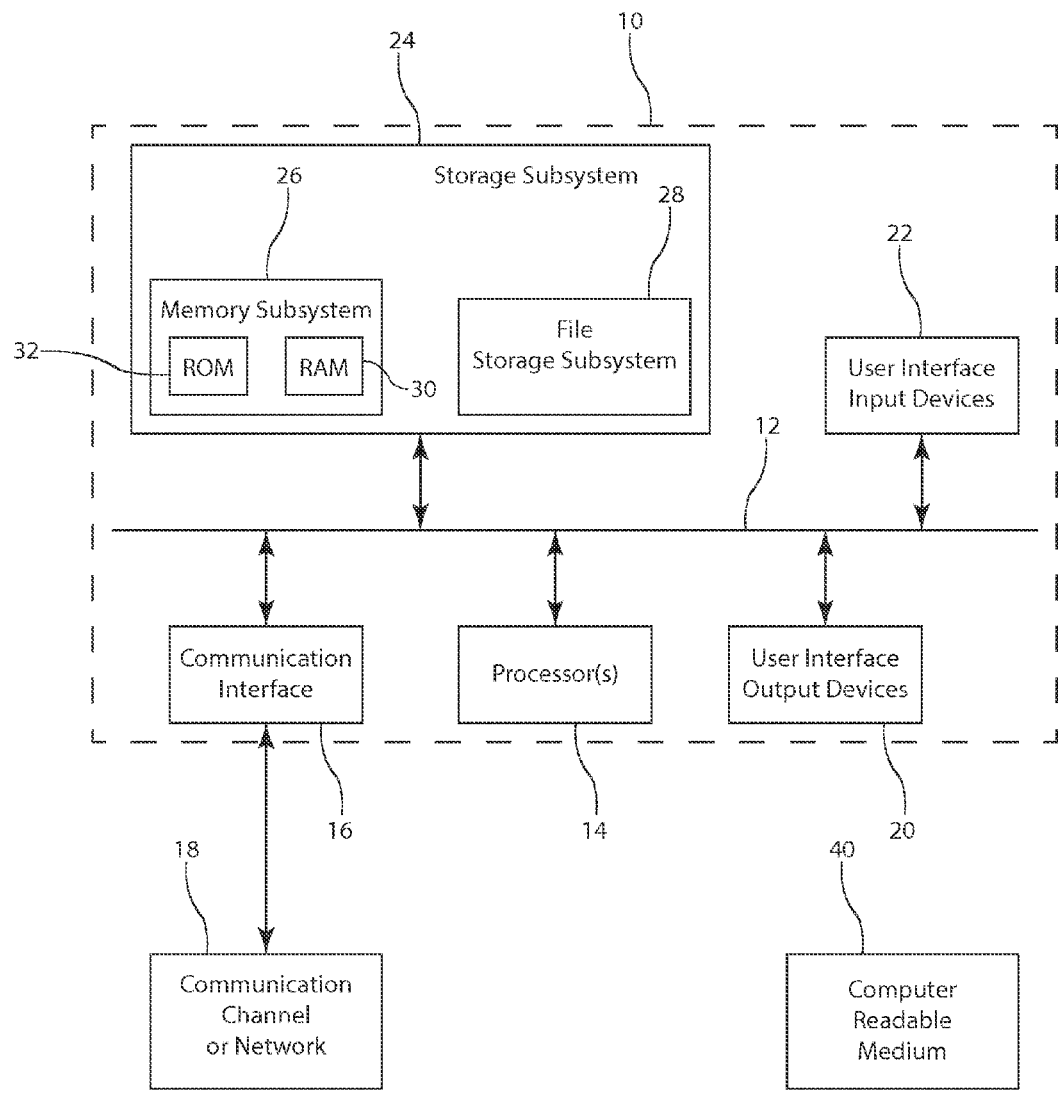
FIG. 1 is a simplified block diagram of a data processor 10 embodying an exemplary platform for components of the cache memory controller for accelerated data transfer.

FIG. 1 is a simplified block diagram of a data processor 10 embodying an exemplary platform for components of the cache memory controller for accelerated data transfer. Data processor 10 typically includes at least one processor or processors 14 used to execute application programs which communicate(s) with a number of peripheral devices via bus subsystem 12. The processor(s) 14 can include internal or on-chip memory 14A, including one or more levels of cache memory, for example. The processors(s) can include specialized application accelerator processors or processor cores, such as video codec, image sensor processor, display or graphics processor to accelerate processing of the application data. The processor(s) can comprise a variety of underlying hardware platforms which can be configured to operated on numerical data at a variety of speeds. Example hardware platforms include but are not limited to the following:

- Intel or AMD x86 central processing unit (CPU) @ 3+GHz (1 core),
- Nvidia Fermi-class graphics processing unit (GPU) (1 streaming multi-processor (SMP)),
- Altera/Xilinx field-programmable gate array (FPGA), including Zynq,
- ASIC system-on-chip (SoC), such as an ARM-enabled application accelerator processor from Qualcomm (Snapdragon), Apple (A4, A5), Texas Instruments OMAP, etc.

The peripheral devices may include a storage subsystem 24, comprising a memory subsystem 26 and a file storage subsystem 28, user interface input devices 22, user interface output devices 20, and a communication or network interface subsystem 16. The input and output devices allow user interaction with data processor 10. Communication interface subsystem 16 provides an interface to outside networks, including an interface to communication channel or network 18, and is coupled via communication network 18 to corresponding interface devices in other computer systems, transmitting or receiving devices, or an outside network (not shown). Communication network 18 may comprise many interconnected computer systems and communication links, for example Ethernet or Infiniband wired links. These communication links may be wireline links, optical links, wireless links, or any other mechanisms for communication of information. While in one embodiment, communication network 18 is the Internet, communication network 18 may be any suitable computer network.

User interface input devices 22 may include a keyboard, pointing devices such as a mouse, trackball, touchpad, or graphics tablet, a scanner, a touchscreen incorporated into the display, audio input devices such as voice recognition systems, microphones, image input devices such as an image sensor, video input devices, and other types of input devices. In general, use of the term "input device" is intended to include all possible types of devices and ways to input information into data processor 10 or onto communication network 18.

User interface output devices 20 may include a display subsystem, a printer, a fax machine, or non-visual displays such as audio output devices. The display subsystem may include a cathode ray tube (CRT), a flat-panel device such as a liquid crystal display (LCD), a projection device, a retinal display, or some other mechanism for creating a visible image. The display subsystem may also provide non-visual display such as via audio output devices. In general, use of the term "output device" is intended to include all possible types of devices and ways to output information from data processor 10 to the user or to another machine or computer system.

Storage subsystem 24 stores the basic programming and data constructs that provide the functionality described herein, including application programs and an application program interface (API) compliant library to implement software drivers for the cache memory controller.

Embodiments of the technology may include an entire library enabling programs for full compliance with a specified API for the underlying hardware configuration, or only those components of the library linked to, or that can be called by, the programs to be executed using the system. These software modules are generally executable and executed by processor(s) 14 that may optionally include some form of hardware acceleration.

Memory subsystem 26 typically includes a number of memories including a main random access memory (DRAM) 30 for storage of instructions and data during program execution and a read only memory (ROM) 32 in which fixed instructions are stored. In some systems, flash memory can be used in addition to, or in the alternative to, the ROM 32. File storage subsystem 28 provides persistent storage for program and data files, and may include a hard disk drive, a floppy disk drive along with associated removable media, a CD-ROM drive, an optical drive, or removable media cartridges such as flash drives having a USB interface. The databases and modules implementing the functionality of certain embodiments may be stored by file storage subsystem 28. As mentioned above, the processor(s) 14 may also include one or more levels of cache memory and other memory on the same integrated circuit as the processor core or cores of the processor(s) 14.

Bus subsystem 12 provides a mechanism for allowing the various components and subsystems of data processor 10 to communicate with each other as intended. Although bus subsystem 12 is shown schematically as a single bus, typical embodiments of the bus subsystem use multiple busses.

Data processor 10 itself can be of varying types including a personal computer, a portable computer, a workstation, a computer terminal, a network computer, a tablet computer, a cellular telephone, smart phone, a television, a mainframe, a supercomputer, a graphics card or accelerator, or any other data processing system or user device. Due to the ever-changing nature of computers and networks, the description of data processor 10 depicted in FIG. 1 is intended only as a specific example for purposes of illustrating the preferred embodiments. Many other configurations of data processor 10 are possible having more or less components than those depicted in FIG. 1.

The data processor 10 is capable of using the processor(s) 14 for executing a plurality of application programs, and of allocating a plurality of threads of each application program concurrently to one or more processor cores of the processor(s) 14. The multiprocessing environment creates varying needs for cache and memory resources. The cache memory controller and associated software driver, described herein, accelerate transfers of a plurality of data types between the cache memory and other memory elements.

The memory 40 can comprise a non-transitory, computer readable data storage medium associated with file storage subsystem 28, and/or with network interface subsystem 16. In some embodiments, the memory 40 may store the instructions of a computer program to be executed by the processors 14 for accelerated data transfers between the processors 14 and the memory subsystem 26. In some embodiments, the memory 40 may store the software implemented instructions for a specific hardware configuration, class of hardware configurations, or for one or more hardware accelerators. In other embodiments, the memory 40 may store instructions for generating a plurality of variant hardware configurations classes of hardware configurations for the cache memory controller. The memory 40 can be a hard disk, a floppy disk, a CD-ROM, an optical medium, removable media cartridge, USB thumb drive, flash media storage or other medium that stores computer readable data in a volatile or non-volatile form.

Figure 2:
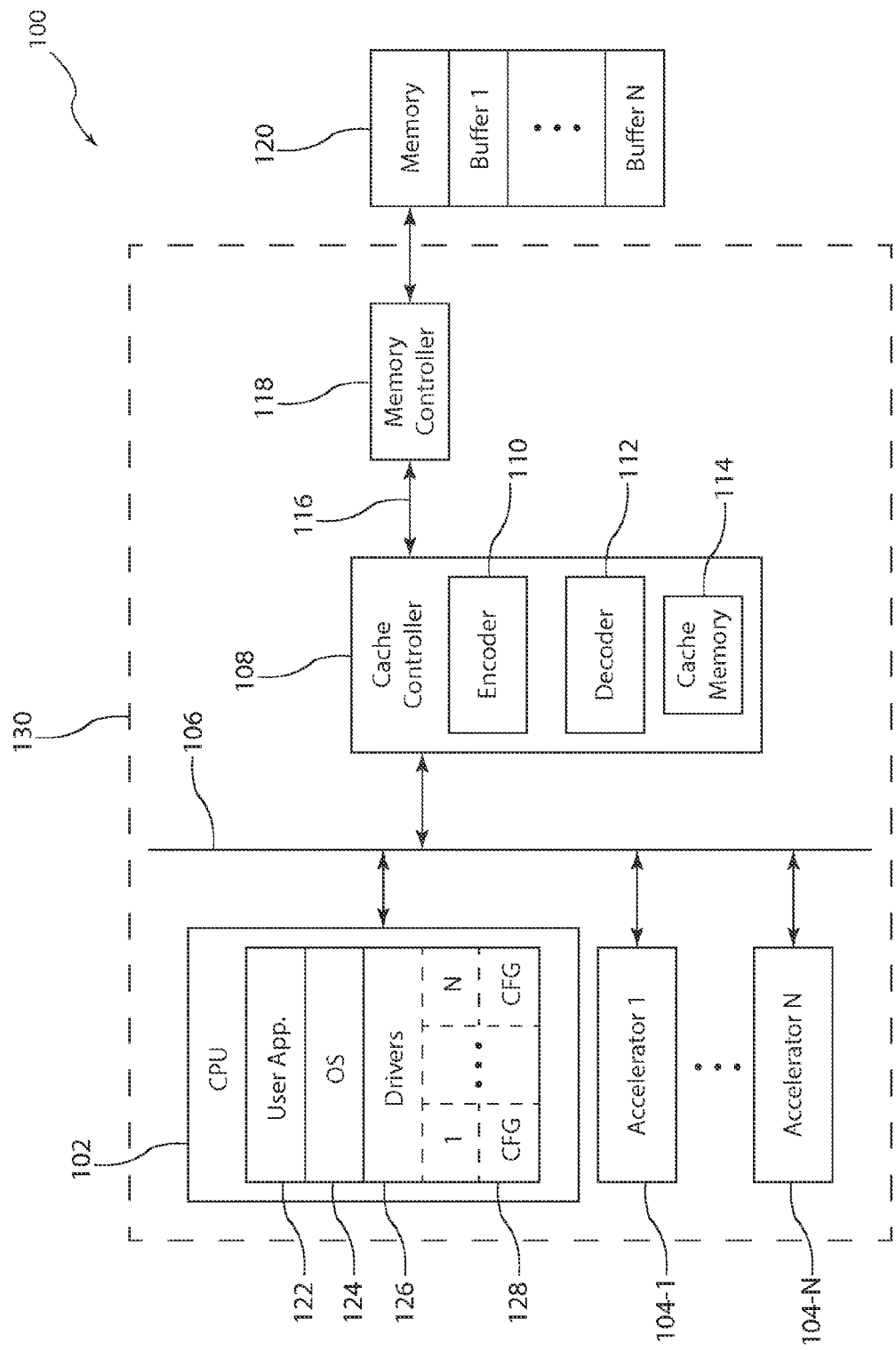
FIG. 2 is a block diagram of an example of a multicore computing system including a cache memory controller in accordance with a preferred embodiment.

FIG. 2 is a block diagram an example of a multicore computing system including a cache memory controller. The multicore computing system 100 may include one or more central processing units (CPUs) 102, which may have a single or multiple core design, and one or more application accelerator processors, or cores, 104-1 to 104-N. The application accelerator processors 104-104-N may include specialized hardware accelerators for processing data intensive functions for particular applications. Examples include a video codec for video encoding and decoding to provide video input or output, an image sensor interface processor to provide image sensor input data to the system 100, and a display processor to process output data for display. The cache memory controller 108 includes operations for accelerated data transfers between the application accelerator processors 104-1 to 104-N and the memory 120. The cache memory controller 108 may include an encoder 110, a decoder 112 and a cache memory 114. The encoder 110 may be configured to apply compression operations to the application data for write operations to the memory 120. The memory 120 may store the compressed application data. The decoder 112 may be configured to apply decompression operations to compressed application data retrieved from the memory 120 in response to a read operation. The cache memory 114 may store uncompressed application data. Uncompressed data as the term "uncompressed" is used herein can refer to data which can be provided as input to a compression engine, or as data output from a decompression engine, including never-compressed data or previously compressed and then decompressed data. The memory controller 118 provides an interface between the rest of the system and the memory 120. The memory controller 118 may be a conventional memory controller and depends on the type of memory 120. Typically, the memory controller translates the accesses from the requestors into commands understood by the memory and includes functional blocks for memory mapping, arbitration, command generation and a data path. The memory controller 118 performs conventional operations for data transfers to/from the cache memory controller 108. The memory 120 may comprise any memory type appropriate for the system design including, but not limited to, DRAM, double data rate (DDRx) synchronous DRAM, and low power DDR (LPD-DRx). While FIG. 2 shows the memory controller 118 in communication with the cache memory controller 108, it may also be interconnected with the CPU 102 and the application accelerator processors 104-1 to 104-N. For a preferred system-on-chip (SoC) architecture 130, processors the memory controller 118 are placed in the SoC and the memory controller 118 is connected to an off-chip dynamic memory 120.

The CPU 102 executes the instructions of computer programs, which may include programs for user applications 122, operating system (OS) 124 and accelerator drivers 126-1 to 126-N. A user application programs provides instructions for a particular function of the multicore computing system 100. Examples include video recording or playback, image capture (camera), audio recording or playback, etc. The user application 122 may require processing by one or more of the application accelerator processors 104-1 to 104-N. The accelerator driver programs 126-1 to 125-N include instructions for communicating commands and parameters to the corresponding application accelerator processors 104-1 to 104-N. In a preferred embodiment, the accelerator drivers 126-1 to N each include a configuration module 128-1 to 128-N with instructions and descriptors provided to the cache memory controller 108 to configure operations of the encoder 110 and decoder 112 for the corresponding application data. The information and sets of parameters associated with the application data are referred to herein as descriptors. The configuration modules 128-1 to 128-N enable the encoder 110 and decoder 112 to be independent of instructions from the user application programs 122 and the operating system 124.

Typically, the CPU 102 may respond to instructions from the operating system to allocate buffers in the memory 120. For the example of FIG. 2, buffer 1 to buffer N are allocated to store application data from the application accelerator processors 104-1 to 104-N, respectively. The location parameters for an allocated buffer can be a pointer to a start address, the buffer size, pointers to the start address and end address, or any convenient representation. The location parameters for the allocated buffer is passed to the corresponding accelerator driver 126-x. The accelerator drivers 126-1 to 126-N then pass the location parameters to the application accelerator processors 104-1 to 104-N. In a preferred embodiment, the accelerator driver 126-x passes the location parameters to the corresponding configuration modules 128-x. The configuration modules 128-1 to 128-N associate the respective location parameters with the sets of parameters and information on data from the corresponding application accelerators 104-1 to 104-N. The configuration module 128-x may include instructions and data to generate one or more descriptors containing the information and parameters that configure the compression and decompression operations to be applied to the application data. During an initialization phase, the CPU may respond to instructions from the configuration modules 128-1 to 128-N to pass the location parameters and associated descriptors to the cache memory controller 108.

The CPU 102, application accelerator processors 104-1 to 104-N, cache memory controller 108, and memory controller 118 may communicate via components 106 and 116 of an interconnection network or bus subsystem.

Figure 3:
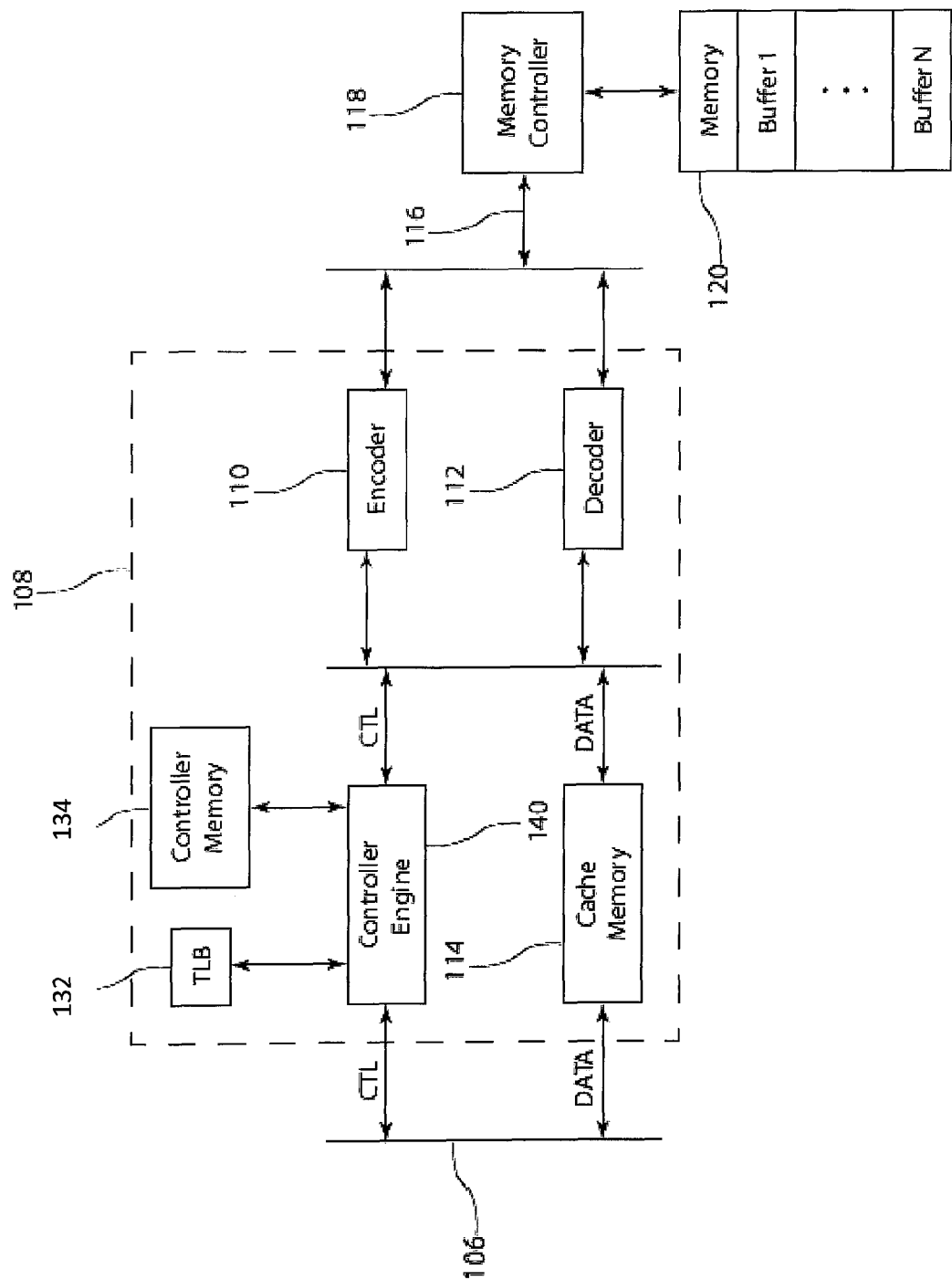
FIG. 3 is a block diagram of the cache memory controller 108, in accordance with a preferred embodiment.

FIG. 3 is a block diagram of the cache memory controller 108, in accordance with a preferred embodiment. During an initialization phase, the controller engine 140 may receive the location parameters and descriptors via a control plane of the bus subsystem 106 from the CPU 102. The location parameters and associated descriptors may be stored in the controller memory 134. The descriptor may be stored as a table in the controller memory 134. A table relating the location parameters with pointers to the associated descriptor table may also be stored in the controller memory 134. The operations of the encoder 110 and the decoder 112 may vary for the different types of application data. The associated descriptor table contains information and the set of parameters appropriate for the particular application data to configure operations of the encoder 110 for writes or the decoder 112 for reads. During a data processing phase, the controller engine 140 monitors memory addresses specified in read requests and write requests from/to the memory 120. The controller engine 140 compares the specified memory address to the location parameters to determine the associated descriptor. The controller engine 140 provides the parameters from the descriptor to the encoder 110 for writes or the decoder for reads. The encoder 110 and the decoder 112 use the parameters to configure the respective operations, as described below. In response to write requests, the controller engine 140 enables the encoder 110 to compress the application data to provide compressed application data to the particular allocated buffer in the memory 120 via the memory controller 118. The memory controller 118 provides the normal control functions for the data transfer to the allocated buffer in the memory 120.

The cache memory 114 may store uncompressed application data. The uncompressed application data may comprise portions of application data received from one or more of the application accelerator processors 104-1 to 104-N and/or portions of decompressed application data received from the decoder 112. The cache memory 114 may comprise one or more of a level 1 (L1) cache, a level 2 (L2) cache, a level 3 (L3) cache, a mid-level cache (MLC) or a last level cache (LLC), as appropriate for the system architecture. The translation lookaside buffer (TLB) 132 stores address information for portions of compressed application data stored in the memory 120 corresponding to portions of uncompressed application data also stored in the cache memory 114. Recently accessed portions of the uncompressed application data may be stored in the cache memory 114 so that they may be provided rapidly to the application accelerator processor 104-x or CPU 102 in response to a subsequent read request. The TLB may store an address table of memory addresses (for locations in memory 120) and the cache memory addresses (locations in cache memory 114) of portions of application data that are presently stored in the cache memory 114. In response to a read request, the controller engine 140 accesses the address information from the TLB 132 to determine whether the portion of application data is in the cache. If the requested portion is in the cache memory 114 (cache hit), it is transferred via the bus 106 to the requesting processor. If the requested portion is not in the cache memory 114 (cache miss), the request is passed to the memory controller 118 for retrieving the portion of application data from the memory 120. The application data retrieved from the memory 120 has previously been compressed by the encoder 110 in response to a previous write request. The controller engine 140 provides the associated descriptor to enable the decoder 112 to decompress the portion of compressed application data. The controller engine 140 may store the decompressed application data in the cache memory 114 and enter the corresponding address information for the portions locations in the memory 120 and the cache memory 114 into the address table of the TLB 132. The cache memory controller 108 transfers the portion decompressed application data to the requesting processor via the bus 106.

Figure 4:
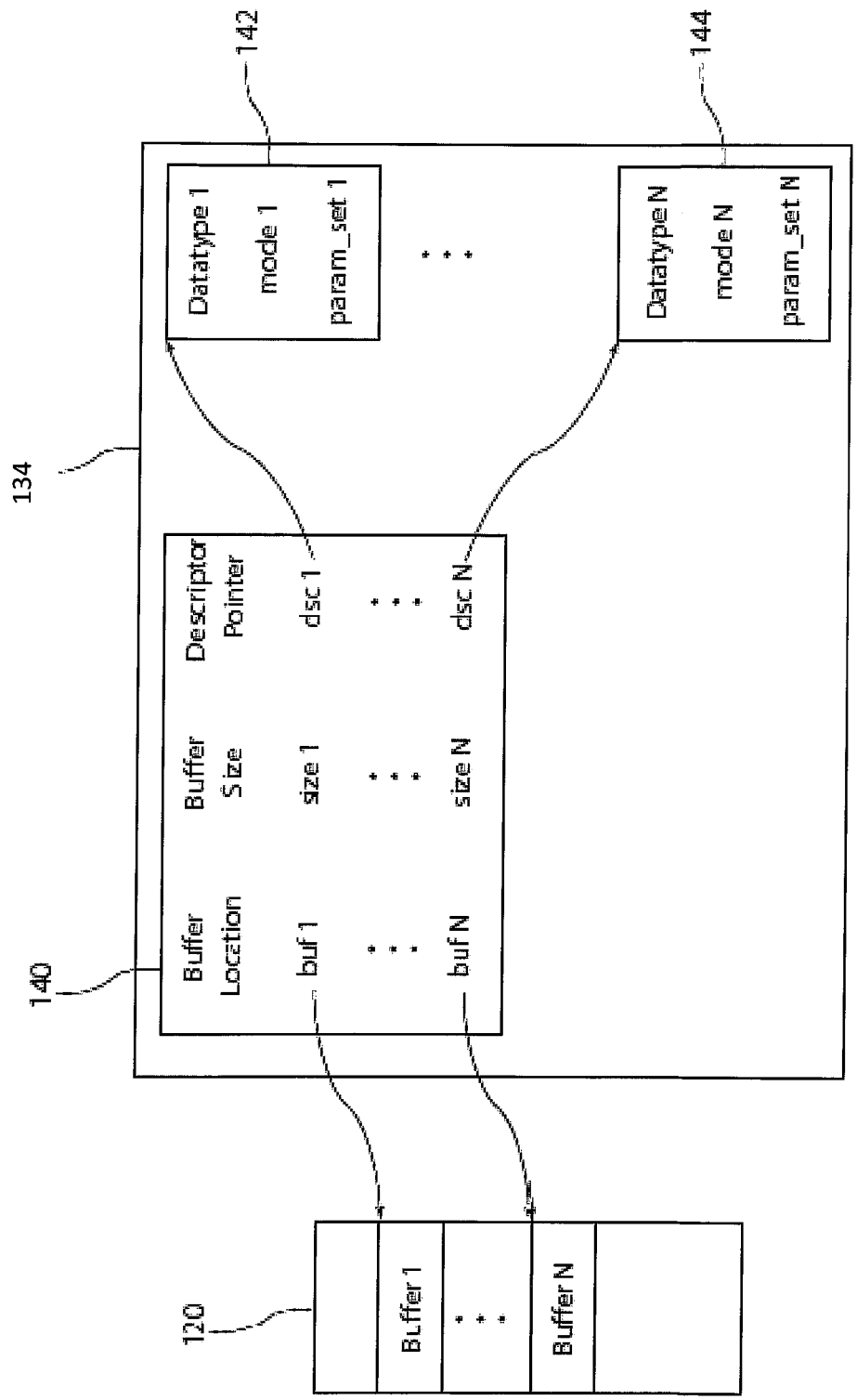
FIG. 4 illustrates an example of the relationships of information in the tables stored in the controller memory.

FIG. 4 illustrates an example of the relationships of information in the tables stored in the controller memory 134. The table 140 relates location parameters of the buffer 1 to buffer N in the memory 120 to the descriptors 142 and 144. The descriptor pointers, dsc1 to dscN, indicate the locations of the descriptors containing information associated with the application data and parameters sets appropriate for configuring operations of the encoder 110 and/or the decoder 112. For simplicity, one descriptor is illustrated for each type of application data. Various embodiments may include one descriptor with parameters for both the encoder 110 and decoder 112 or separate descriptors for the encoder parameters and the decoder parameters.

In some embodiments, more than one buffer may be allocated for application data from a single application accelerator processor 104-x. Each allocated buffer may store a particular component of the application data. For example for color image or video data, data for the different color components may be stored in separate allocated buffers. The buffer location parameter for each allocated buffer will be associated with a descriptor having parameters for compressing or decompressing the particular component of the application data.

Figure 5:
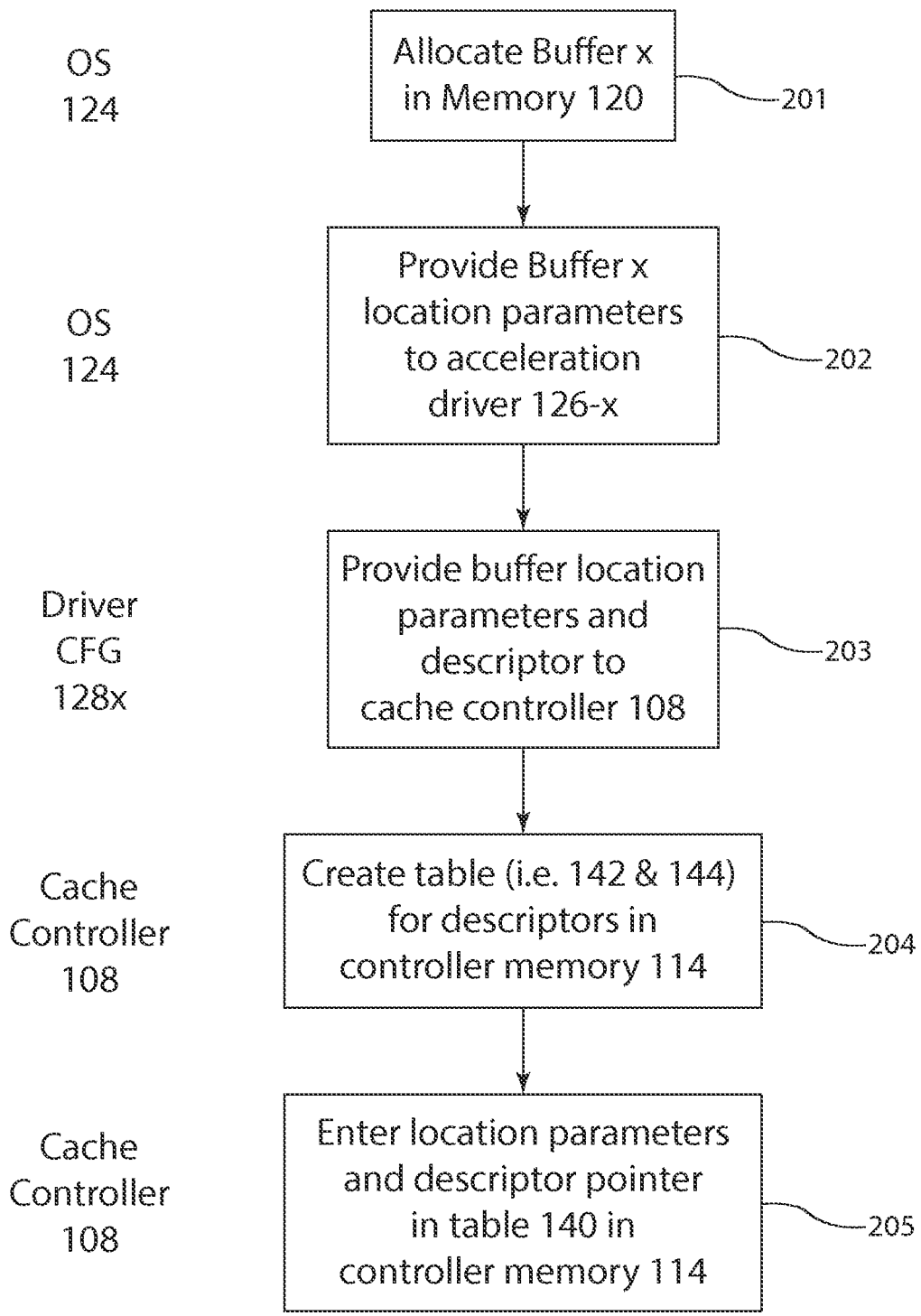
FIG. 5 is a flow chart illustrating an example of operations of the computing system 100 during an initialization phase.

FIG. 5 is a flow chart illustrating an example of operations of the computing system 100 during an initialization phase. During the initialization phase, the cache memory controller 108 is provided with configuration information used to configure compression and decompression operations to be applied to the application data during a data phase. In step 201, an instruction from the OS 124 allocates a buffer X in the memory 120 to store application data from application accelerator processor 104-x. In step 202, an instruction from the OS 124 provides location parameters of the buffer x to the accelerator driver 126-x, which passes the location parameters to its configuration module 128x. In step 203, an instruction from the configuration module 128x provides the location parameters and the associated descriptor to the cache memory controller 108. In step 204, the cache memory controller stores the associated descriptor, such as table 142 in FIG. 4, in the controller memory 134. There may be separate associated descriptors for the encoder 110 and the decoder 112. In step 205, the location parameters and pointer the associated descriptor are entered in a table 140 in the controller memory 134, as described with respect to FIG. 4. These steps may be applied for each of the application accelerator processors 104-1 to 104-N to be used.

Figure 6:
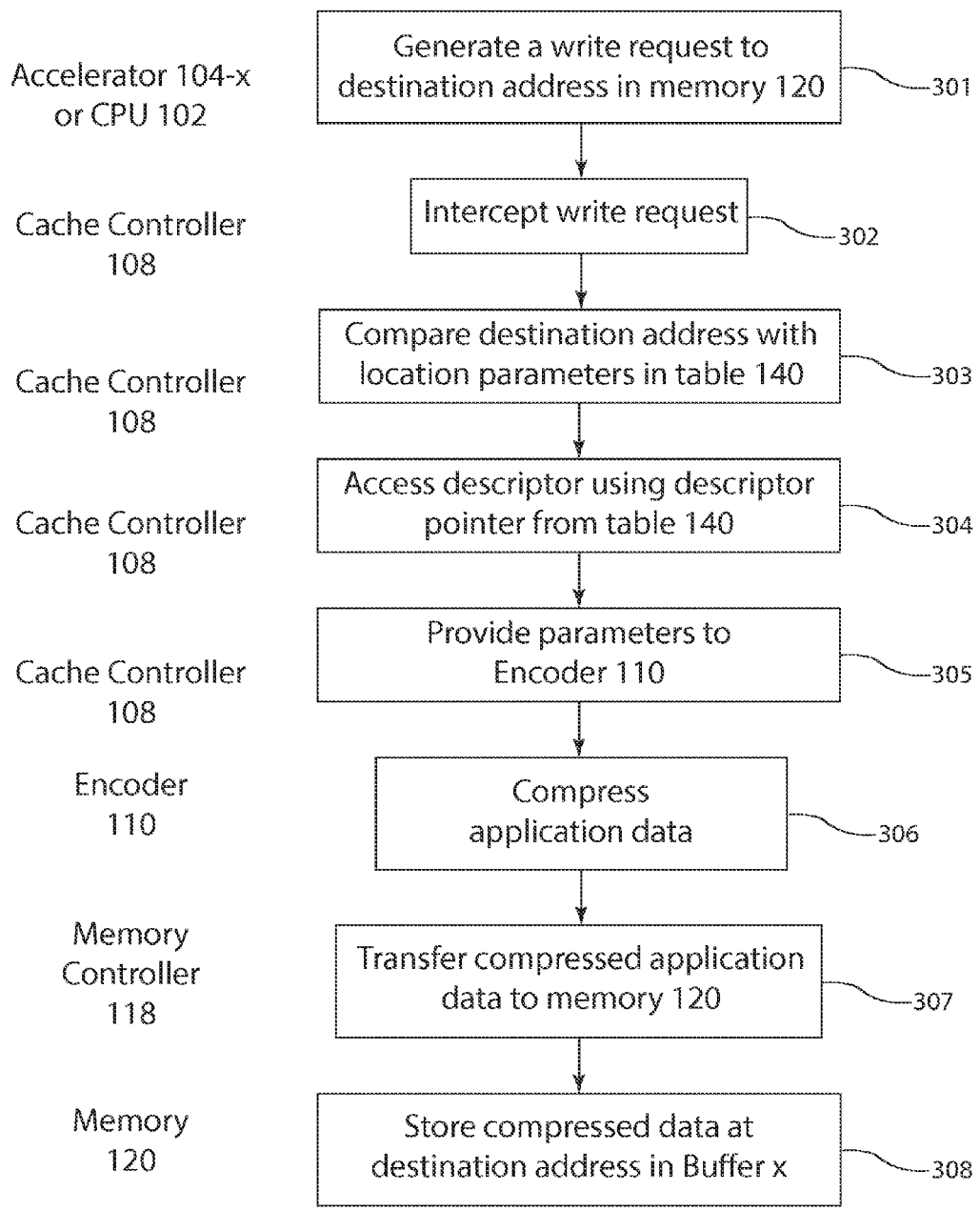
FIG. 6 is a flow chart illustrating an example of operations of the computing system 100 in response to a write request.

FIG. 6 is a flow chart illustrating an example of operations of the computing system 100 in response to a write request. During a data phase, the cache memory controller may intercept write requests and configure the encoder 110 to compress the application data prior to writing to the memory 120. In step 301 the application accelerator processor 104-x or the CPU 102 generates a write request including a destination address in memory 120. In step 302, the cache memory controller 108 intercepts the write request. In step 303, the controller engine 140 compares the destination address with the location parameters in table 140 to identify the buffer X location parameter corresponding to the destination address. In step 304, the controller engine 140 uses the descriptor pointer in table 140 to access the descriptor (i.e. FIG. 4) associated with the buffer X location parameter. In step 305, the controller engine 140 provides parameters from the descriptor to the encoder 110 to configure compression operations. In step 305, the encoder 110 compresses the application data according to the parameters to form compressed application data. In step 307, the memory controller transfers the compressed application data output from the encoder 110 to the memory 120. In step 308, the memory 120 stores the compressed application data at the destination address in buffer X.

Figure 7:
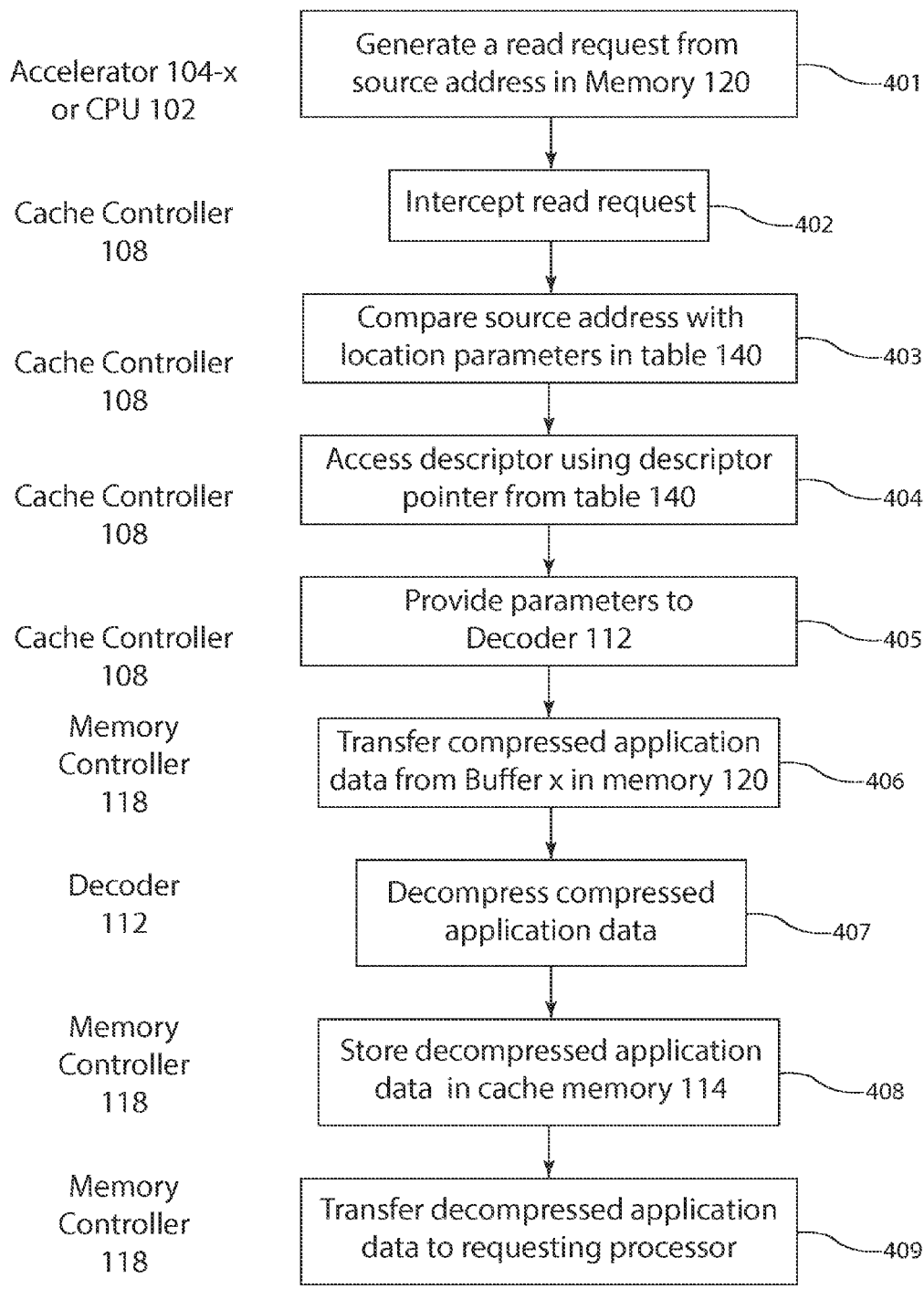
FIG. 7 is a flow chart illustrating an example of operations of the computing system 100 in response to a read request.

FIG. 7 is a flow chart illustrating an example of operations of the computing system 100 in response to a read request. During a data phase, the cache memory controller may intercept read requests and configure the decoder 112 to decompress the compressed application data retrieved from the memory 120. In step 401 the application accelerator processor 104-x or the CPU 102 generates a read request including a source address in memory 120. In step 402, the cache memory controller 108 intercepts the read request. In step 404, the controller engine 140 compares the source address with the location parameters in table 140 to identify the buffer X location parameter corresponding to the source address. In step 404, the controller engine 140 uses the descriptor pointer from table 140 to access the descriptor (i.e. FIG. 4) associated with the buffer X location parameter. The descriptor may be a decompression descriptor. In step 405, the controller engine 140 provides parameters from the descriptor to the decoder 112 to configure decompression operations. In step 406, the memory controller 118 transfers the compressed application data from the source address in buffer X of the memory 120 to the decoder 112. In step 407, the decoder 112 decompresses the application data according to the parameters to form decompressed application data. In step 408, the cache memory 114 stores the decompressed application data output from the decoder 112. In step 409, the cache memory controller 108 transfers the decompressed application data to the requesting processor.

Figure 8:
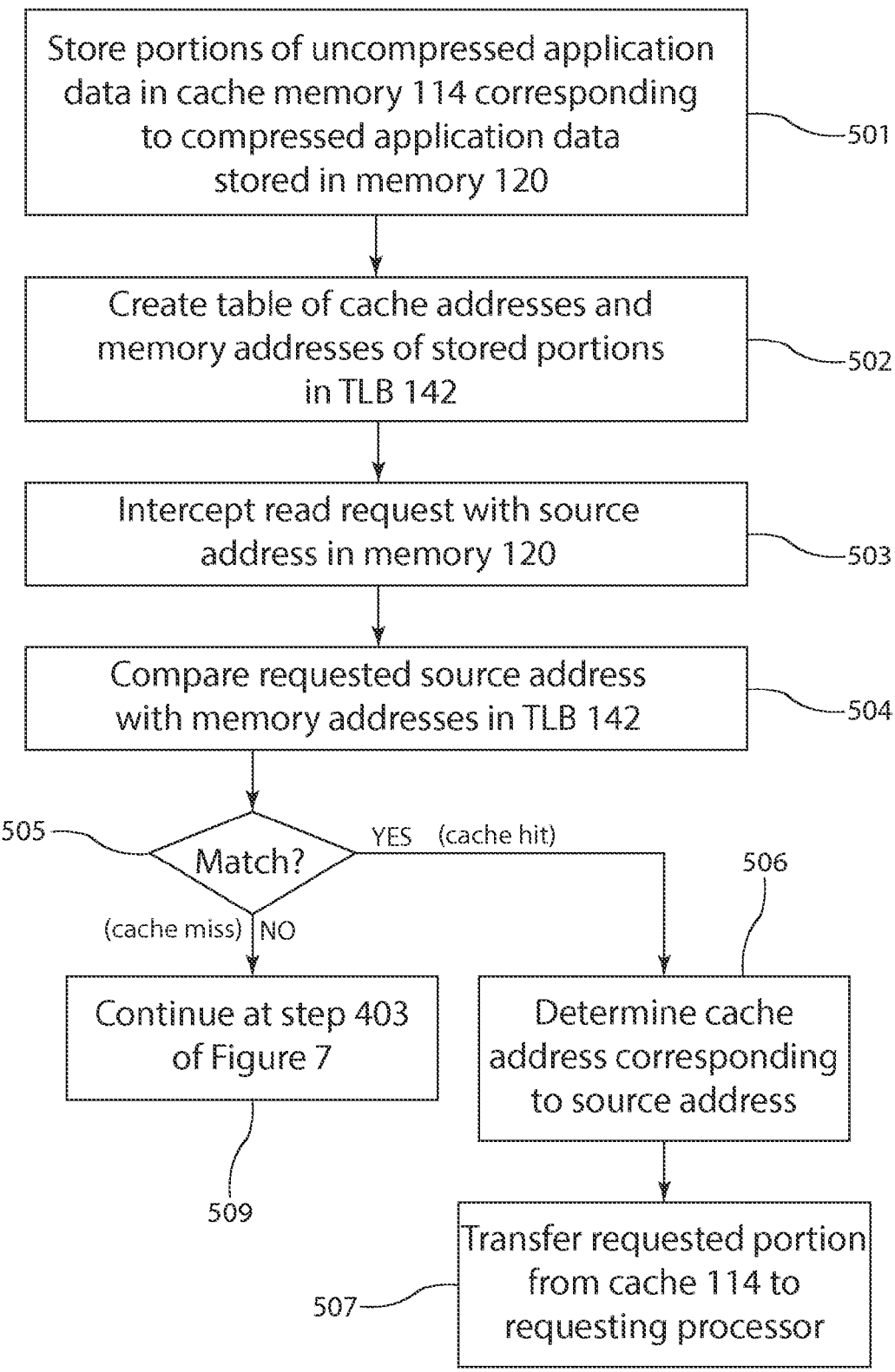
FIG. 8 is a flow chart illustrating an example of operations of the cache memory controller to retrieve portions of uncompressed application data stored in the cache memory.

FIG. 8 is a flow chart illustrating an example of operations of the cache memory controller 108 to retrieve portions of uncompressed application data stored in the cache memory 114. In step 501 portions of uncompressed application data are stored in the cache memory 114 corresponding to compressed application data stored in the memory 129. The portions of uncompressed memory may comprise never compressed application data provided by the application accelerator processor 104-x or decompressed application data provided by the decoder 112. The encoder 110 previously provided the compressed application data currently stored at memory addresses in the memory 120. In step 502 the cache memory controller creates a table of cache addresses of the cache memory 114 and memory addresses of the memory 120 where the corresponding portions of uncompressed and compressed application data are stored. This address table is stored in the TLB 132. In step 503, the cache memory controller intercepts a read request including a source address in the memory 120. In step 504, the controller engine 140 compares the requested source address with the memory addresses in the address table in the TLB 132. In step 505, controller engine 140 determines if the source address matches one of the memory addresses in the address table. If yes, the requested portion is already stored in the cache memory 114. This condition is referred to as a cache hit. In step 506, the controller engine 140 determines the cache address corresponding to the requested source address using the address table. In step 507, the cache memory controller 108 transfers the requested portion from the cache memory 114 to the requesting processor. Returning to step 505, if the requested source address does not match one of the memory addresses in the address table, the requested portion must be retrieved from the memory 120. This condition is referred to as a cache miss. In step 509, the operations continue with step 403 of FIG. 7 to retrieve and decompress the requested portion.

The cache memory controller 108 may also support direct memory access (DMA) transfers from the application accelerator processor 104-x to the memory 129. The application accelerator processor 104-x may provide a DMA descriptor containing a source address in a source memory, a destination address in the memory 120 and a length parameter indicating the size of the data to be transferred. The length parameter may represent a block size, a packet length, raster length or other suitable representation of the portion of application data to be transferred. The cache memory controller 108 may compare the destination address with the location parameters in the table 140 to determine the pointer to the associated descriptor. The controller engine may provide the associated descriptor information to the encoder 110 for writes or the decoder 112 for reads.

Since the application data are compressed for the data transfers to/from the memory 120, the effective bandwidth of data transfers between on-chip and off-chip components of the memory system is increased, thus increasing the effective memory bandwidth of the memory 120. This increase in effective memory bandwidth reduces latencies in processing application data in data intensive computations where frequent exchanges between on-chip and off-chip memory components occur. The buffers allocated in the memory 120 by the OS 124 to store the various application data may remain the same. Thus, the memory size for the application data may remain the same, although the compressed application data may occupy less than the allocated buffer in the memory 120.

Furthermore, the compression operations providing the increased effective memory bandwidth are transparent to the application program 122 and the OS 124. The interactions between the software elements of the user application program 122, the OS 124, driver 126 and the application accelerator processors 104-1 to 104-N remain the same. The accelerator drivers 126 are modified by adding configuration modules 128. The configuration modules include the descriptors and instructions to provide the descriptors to the cache memory controller 108. The descriptors provide the appropriate parameters for the encoder 110 and decoder 112 to apply to the particular type of application data.

The encoder 110 and decoder 112 may use the parameters provided in the descriptors to configure operations for a variety of different data types and formats of the application data. Preferred embodiments of the encoder 110 and decoder 112 are described below. Alternative embodiments of the encoder 110 and decoder 112 may employ subsets of the operations described. Other alternative embodiments may implement different compression algorithms in the encoder 110 and decompression algorithms in the decoder 112.

Figure 9:
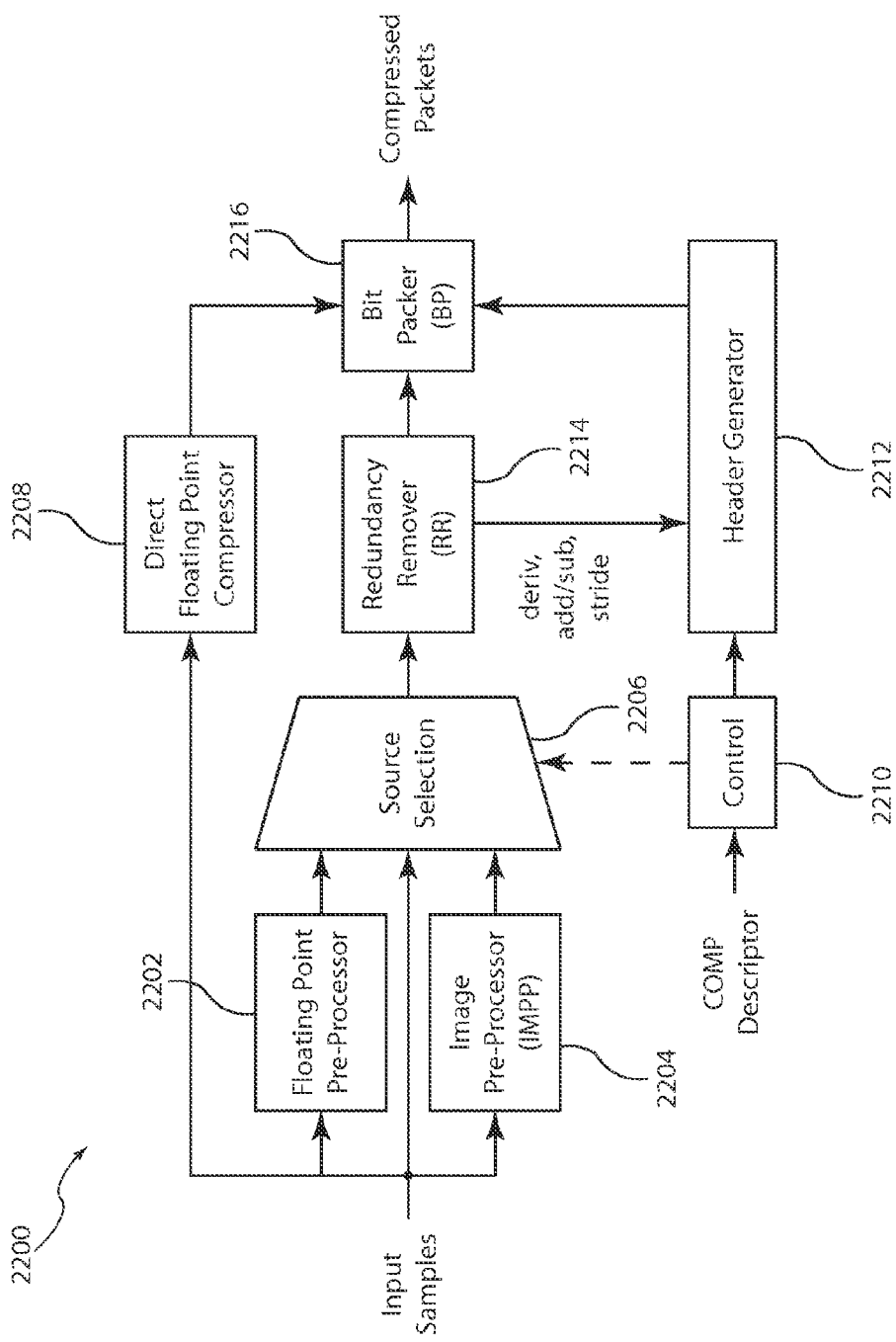
FIG. 9 is a block diagram of a compressor of the encoder according to a preferred embodiment.

FIG. 9 is a block diagram of a compressor 2200 of the encoder 110 according to a preferred embodiment. The cache memory controller 108 provides the descriptor to the controller 2210. The controller 2210 provides parameters from the descriptor to configure the operations of the various processing blocks. The compressor 2200 comprises the following blocks:

pre-processor blocks for:
Floating Point Pre-processor 2202 to convert data types between 32-bit and 64-bit floating-point samples and 32-bit integer samples,
Image Pre-Processor 2204, for RGB, YUV, and Bayer matrix image data
Redundancy Remover (RR) 2214
Bit packer (BP) 2216
Header Generator 2212
Direct Floating Point Compressor 2208
Controller 2210

For example, when the compression mode is lossless floating point mode, the floating point pre-processor 2202 converts floating-point samples to integer samples. Preferably, both 32-bit single-precision floats and 64-bit double-precision floating point samples may be converted to 32-bit integer samples. The source selector 2206 selects the integer samples for compression by the redundancy remover 2214, based on control parameters received from the controller 2210.

The direct floating-point compressor 2208 provides direct compression of the floating-point samples, without first converting the floating-point samples to integer samples. The direct floating-point compressor 2208 produces lower latency than conversion followed by integer compression. The '330 application describes several alternative compression modes for direct floating-point compression that may be implemented by the direct floating-point compressor 2208. Two of these compression modes, referred to herein as FP2 and FP4, apply thresholds to the exponents of the floating-point samples to categorize the floating-point samples. The FP2 mode applies one threshold to generate two classes, or "buckets". The FP4 mode applies three thresholds to generate 4 classes, or "buckets". Varying amounts of compression are applied to floating-point samples based on their class.

The image pre-processor (IMPP) 2204 processes various imaging data formats, including:
Red-Green-Blue (RGB)
Intensity & Chroma (YUV)
Image sensor pixels (Bayer matrix)

These imaging data formats are a special integer sub-type. In many imaging subsystems, RGB, YUV, and Bayer samples are stored as interleaved N-bit integers, where N=8, 10, 12, or 16. Conversion between RGB and YUV imaging data formats is performed by averaging color components can optionally resample the chroma (U and V) channels of YUV signals. Decimation may be supported for YUV format, although RGB-YUV conversion may precede YUV chroma downsampling. The image pre-processor 2204 reformats the image samples to a one-dimensional, color component-interleaved stream of integers. The '511 application describes preprocessing operations for the image pre-processor 2204. The source selector 2206 selects the image sample stream for compression by the redundancy remover 2214, based on control parameters received from the controller 2210.

In one embodiment, the redundancy remover (RR) 2214 uses a signed 32-bit integer internal data path, generates two redundancy-removed alternatives and then determines whether the samples themselves, or one of the two redundancy-removed alternatives would result in the best compression. The redundancy remover 2214 calculates the number of bits per compressed packet for each of the alternatives and selects the one having the fewest bits. The alternative selected for the next packet(i+1) may be performed at the end of a current packet(i). The selected alternative is stored in the packet header of next packet(i+1) and will provide a control parameter for decompression operations. The redundancy remover 2214 produces compressed integer samples for the bit packer 2216.

The redundancy remover 2214 may include a center frequency estimator that for 1D signals that automatically sets RR-internal control parameters STRIDE1, STRIDE2, ADD_SUB, and FIFO2_SEL based on the estimated center frequency value. For example, a center frequency estimator may select one of six frequency bands: DC, fs/8, fs/6, fs/4, fs/3, and fs/2, where fs is the sample rate. These bands determine the control parameters STRIDE1, STRIDE2, FIFO2_SEL and ADD_SUB values that control the redundancy remover (RR) 2214 and add/subtract elements. These parameters are further described below. The center frequency estimator operates over a programmable number of input samples (typically 256 or 1024). Aspects of the redundancy remover 2214 are found in commonly owned U.S. Pat. No. 7,009,533 (the '533 patent), entitled "Adaptive Compression and Decompression of Bandlimited Signals, by Albert W. Wegener, which is incorporated by reference, as if fully set forth herein. The redundancy remover 2214 is described in more detail below.

For input data that does not exhibit a center frequency, such as image data, the redundancy remover (RR) 2214 may operate in manual mode for selecting control parameters STRIDE1, STRIDE2, FIFO2_SEL and ADD_SUB. These control parameters are stored in the BAND_DERIV field of each packet header.

The bit packer 2216 may apply block floating point encoding to the compressed integer samples output from the redundancy remover 2214 to form packets of compressed data. The block floating point encoding groups the compressed integer samples and encodes 1 or 2 block exponents with every group of 4 or 8 mantissas. The block exponents (or more specifically, exponent differences) are encoded in pairs when possible and as absolute exponents when they cannot. The exponent tokens are preferably 4 or 8 bits long. The block floating point exponent encoding exploits correlation between the block exponents to minimize the number of bits required to encode them. The exponent tokens are followed by encoded mantissas corresponding to the encoded group. Each of the encoded mantissas in a given encoded group contains the same number of bits, indicated by the block exponent for the group. The '245 application describes embodiments of the block floating point encoding that may be implemented for the bit packer 2216. The header generator 2212 may encode control parameters for a header section of the compressed data packet.

Figure 10:
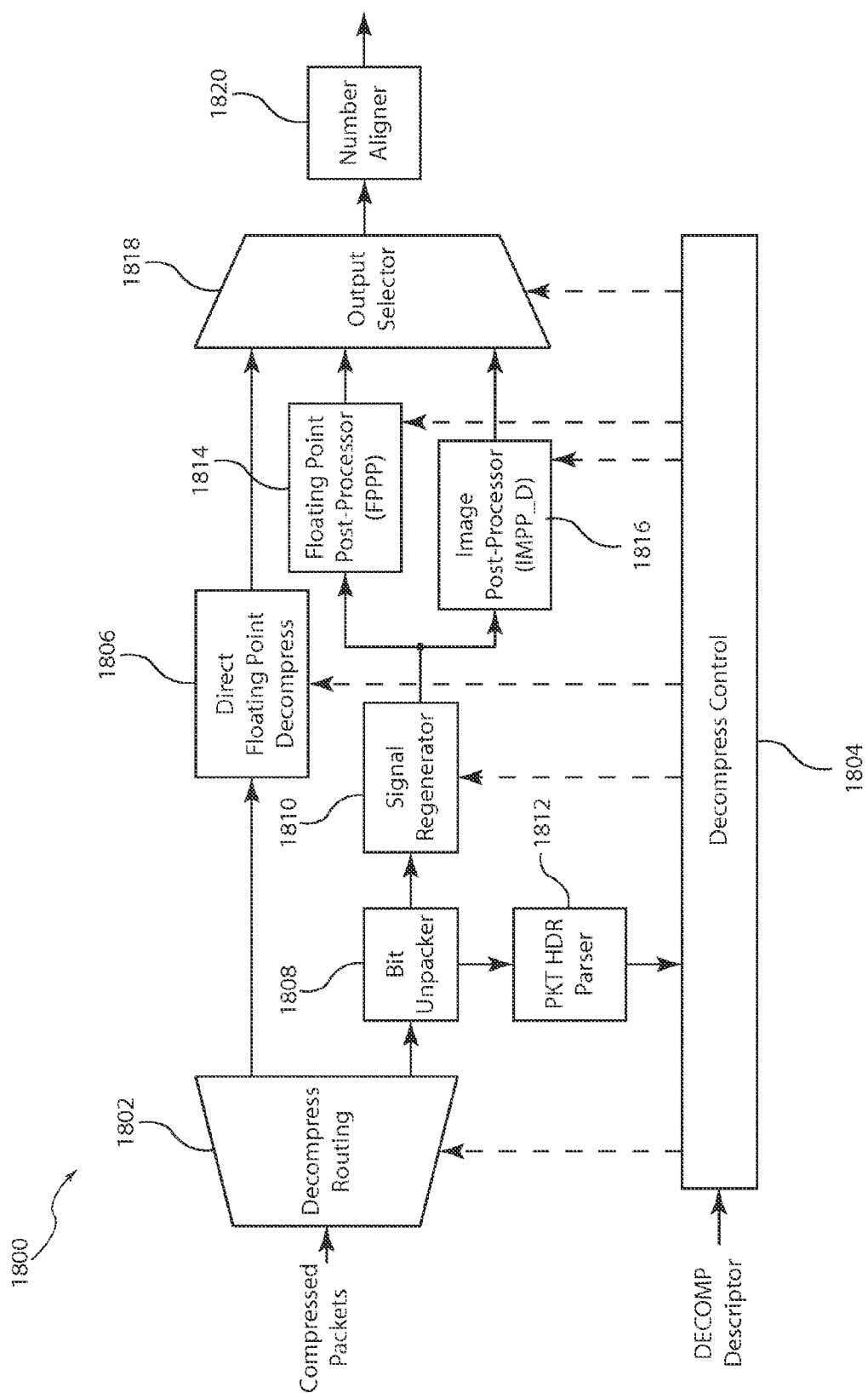
FIG. 10 is a block diagram of a decompressor of the decoder according to a preferred embodiment.

FIG. 10 is a block diagram of a decompressor engine 1800 of the decoder 112 according to a preferred embodiment. The cache memory controller 108 provides decompression control parameters via the descriptor to the decompression controller 1804. The decompression controller 1804 provides parameters to the various processing blocks to configure their operations. The decompressor 1800 may access additional control parameters stored in the compressed data packet header. The decompressor 1800 performs the inverse operations of the compressor 2200, generating the identical or substantially similar samples that the compressor 1800 originally received.

The bit unpacker 1808 decodes each packet header 2100 to extract control parameter information for decompression operations. The bit unpacker 1808 applies block floating point decoding to each packet's compressed groups of exponent tokens and encoded mantissas. The exponent token for the block floating point encoding group indicates the number of bits for each mantissa in the group. The '245 application describes embodiments of the block floating point decoding that may be implemented for the bit unpacker 1808.

The packet header parser 1812 retrieves the control parameters STRIDE1, ADD_SUB, DERIV, and INT_OR_FLOAT fields and distributes them to the decompressor logic blocks that require these parameters. The packet header parser 1812 extracts the various control parameters (such as ATTEN, STRIDE, ADD_SUB, and DERIV) from each packet header and configures the signal regenerator 1810 accordingly. The signal regenerator 1810 reverses the derivative and attenuator actions of the redundancy remover (RR) 2214. The signal regenerator 1810 retrieves several of its control parameters from each packet header 2100, including STRIDE1, ADD_SUB, DERIV, and ATTEN. Where the redundancy remover 2214 subtracted samples, signal regenerator 1810 adds them. Where the redundancy remover 2214 added samples, the signal regenerator 1810 subtracts them. Where the redundancy remover 2214 attenuated samples, the signal regenerator 1810 amplifies them.

The direct floating point decompressor 1806 decompresses the compressed data, such as from the FP2 and FP4 modes, and reconstructs floating-point data. The '330 application describes decompression to reconstruct the floating-point data for several alternative compression modes that may be implemented by the direct floating-point decompressor 1806.

The floating point post-processor 1814, which receives its input from the signal regenerator 1810, regenerates an approximation to the original floating-point values that were input to the floating point pre-processor 2202.

The image post-processor 1816 regenerates an exact (or approximate) representation of the color components that were input to the image pre-processor 2204. For example, if the image pre-processor 2204 performed chroma downsampling, image post-processor 1816 performs chroma upsampling. If the image pre-processor 2204 performed color space conversion, the image post-processor 1816 performs color space re-conversion. The decompression controller 1804 provides the control parameters to configure the operations of the image post-processor 1816. The control parameters for the image post-processor 1816, such as the color image format, may be included in the descriptor provided to the decompression controller 1804.

The output selector 1818 selects an input from the direct floating-point decompressor 1806, the floating point post-processor 1814, or image post-processor 1816 and provides the selected data to the number aligner 1820.

The number aligner 1820 accepts 32, 64, 128, or 256 bit units from the output selector 1818 and separates (demultiplexes) them into sample-wide units. The number aligner 1820 uses the control parameter D_TYPE 1905 to properly separate the 32-bit input bits into 1, 2, 4, or ½ sample values, depending on the data type of the output samples and the width of the bus at the output of the number aligner 1820.

Components of the compressor 2200 are described in more detail in the following. The floating point pre-processor 2202 may include float to integer format conversion. The float to integer format converter may normalize a set of input floating-point numbers by using a scale factor to form a set of normalized floating-point numbers. Normalization adapts the range of the fixed-point integer samples to the range of a particular set of input floating-point samples, thus preserving more accuracy. Alternatives for determining the scale factor for the set of input floating-point numbers include the following:

1) Determining the maximum magnitude value (both mantissa and exponent) of the floating-point numbers in the set, f_max, and determining the scale factor F_SCALE using the equation set out below, 2) Using the F_SCALE of a previous set of floating-point numbers for a current set, or 3) Predicting a maximum magnitude value f_max for the current set based on that of one or more previous sets and calculating F_SCALE based on the predicted f_max.

The first option for the scale factor produces scaled floating-point numbers where the maximum magnitude in the set is 1.0 or less, so that floating-point numbers in the set will have values in the range of {−1.0, +1.0}. The second option reduces the computational latency for the current set. After normalization, the float to integer format converter converts the scaled floating-point numbers to integer numbers.

In an alternative embodiment, the float to integer format converter determines the maximum exponent value of the floating-point numbers in the set. For this alternative, the float to integer format converter may provide approximate normalization during format conversion, without a multiplication by the floating-point scale factor F_SCALE. This reduces computational complexity by eliminating the floating-point multiplier. The approximate normalization provides magnitude values less than 2.0 for the set. Alternatives for determining the maximum exponent value for the set include the following:

1) Determining the maximum magnitude exponent value, EXP_SCALE, of the floating-point numbers in the set and providing the EXP_SCALE to the float to integer format converter, 2) Using the maximum magnitude exponent value of a previous set of floating-point numbers for a current set, or predicting a maximum magnitude exponent value for the current set based on that of one or more previous sets, and providing that value as EXP_SCALE to the format converter.

In one embodiment of the float to integer format converter, the input floating-point data are represented in NB bits per sample. The number of bits per integer sample at the output is Nbits. The maximum floating-point value for a set of input floating-point samples, f_max, is determined and the scale factor F_SCALE is calculated as follows, $$F\_SCALE = [2^{(Nbits-1)} - 1]/f\_max$$

Each floating-point number in the set is multiplied by F_SCALE to form a scaled floating-point number. Logic to round each scaled floating-point number provides the output integer number. The integer number is represented in a binary two's-complement format having Nbit bits. The two's-complement integer format is used for illustrative purposes. The particular integer format does not limit the scope of the invention, as the floating-point data may be converted to other integer formats.

A second embodiment of the float to integer format converter separately processes the sign bit, exponent bits and mantissa bits to produce an integer in two's-complement format. For IEEE 754 single precision format, the mantissa has NM=23 bits and the exponent has NE=8 bits. For IEEE 754 double precision format, the mantissa has NM=32 bits and the exponent has NE=11 bits. The "hidden bit" is set to "1" for the integer mantissa. The hidden bit corresponds to the leading one of the integer mantissa. The resulting mantissa may provide a positive mantissa, "pos_mant". In two's-complement format, a negative number may be represented by inverting the bits of the positive mantissa and adding "1". Inverting the bits of the positive mantissa and adding "1" to the inverted bits provides a negative mantissa, "neg_mant". The sign value, pos_mant and neg_mant are provided to a selector that selects pos_mant if the sign value is "0" or neg_mant if the sign value is "1". The selected mantissa is right-shifted based on the exponent value, "exp," of the input floating-point number, or alternatively, by the difference of exp and EXP_SCALE. The shift increment corresponding to the exponent value shifts the mantissa bits to the corresponding bit locations for the integer representation. The shift increment corresponding to EXP_SCALE provides the approximate normalization by the value EXP_SCALE, as described above. Alternatively, when the floating-point number has already been scaled by F_SCALE, the EXP_SCALE value is not used. In this case, the exponent value "exp" determines the number of right shifts for the selected mantissa, pos_mant or neg_mant. The resulting sample has a two's-complement integer representation with Nbits per sample. For example, the output integer may have 32 bits. The resulting integer outputs are then compressed by the redundancy remover 2214.

Figure 11:
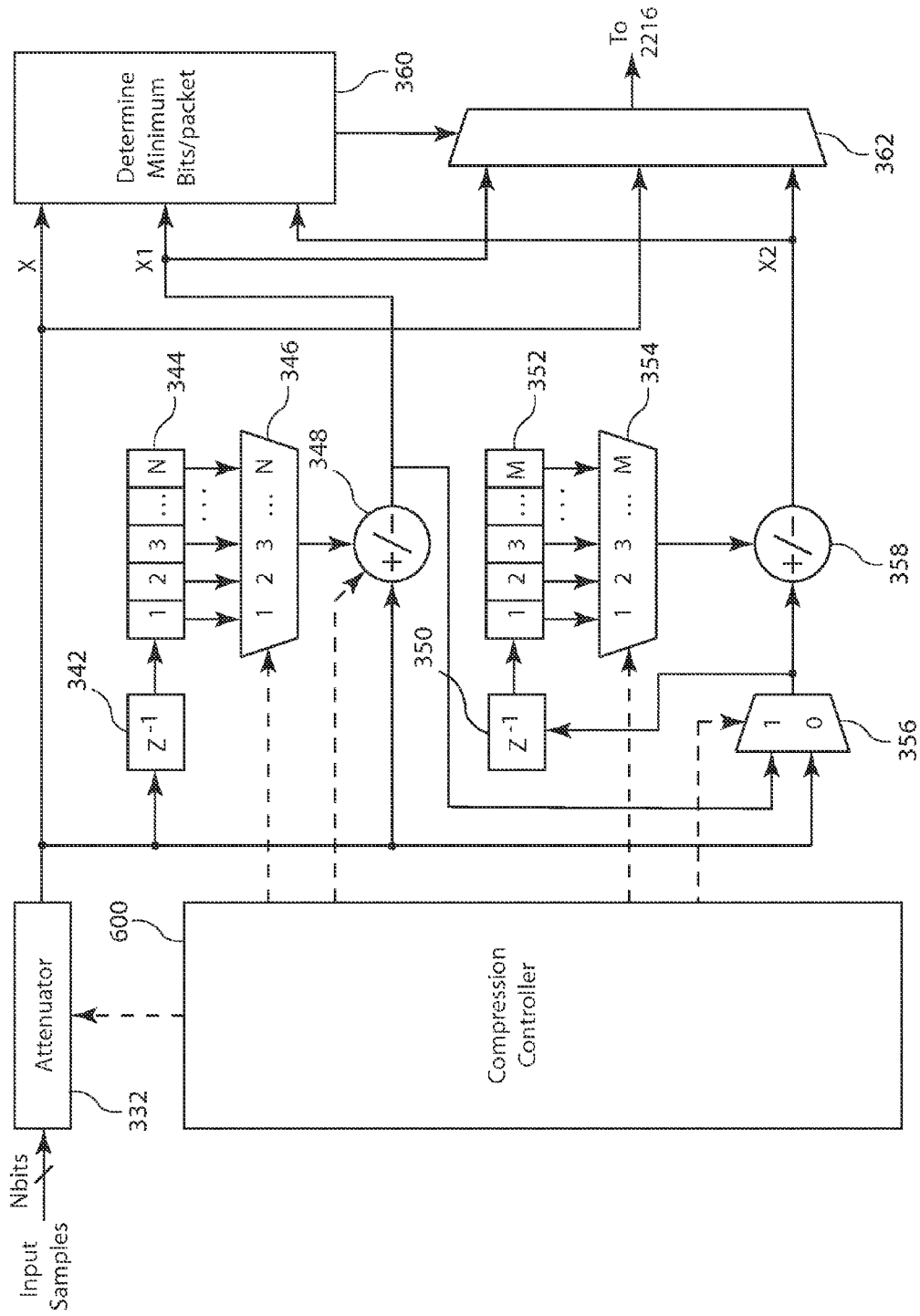
FIG. 11 illustrates an adaptive architecture for the redundancy remover of FIG. 9, with an attenuator, as used in one example system for integer compression.

FIG. 11 illustrates an adaptive architecture for the redundancy remover 2214 of FIG. 9, with an attenuator, as used in one example system for integer compression. The controller 2210 of FIG. 9 may include the functionality of the compression controller 600 of FIG. 11. This architecture is configurable to perform sums or differences between samples with selectable sample separations and to determine the sample, sample difference/sum or derivative order providing the minimum bits per packet, or best compression. The attenuator 332 may attenuate the integer sample x(n) by an attenuation factor indicated by the compression controller 600 or no attenuation may be indicated. The attenuator 332 may reduce the magnitude of the integer sample by multiplying by an attenuation factor value less than one or by shifting out a number LSBs (dividing by 2) based on an attenuation factor. Applying the attenuator 332 will result in lossy compression. For the following description, the variable x(n) represents the integer sample with or without attenuation. The FIFO buffer 344 stores N previous samples x(n−1) to x(n−N), where the delay element 342 provides x(n−1). The selector 346 selects a sample x(n−m) with the desired sample separation from the FIFO buffer 344. The add/subtract element 348 computes the sum or difference between the current integer sample x(n) and the selected sample x(n−m) to form a first result x1(n). If add/subtract element 348 is set to subtract, the result x1(n) represents a first derivative. When the sample spacing index m=1, the result x1(n) is the first derivative of adjacent samples. When the third selector 356 is set to "1", the first result x1(n) is delayed by a second delay element 350 to form x1(n−1) and provided to a second FIFO buffer 352. The second FIFO buffer 352 may store up to M samples of x1 from x1(n−1) to x1(n−M). The second selector 354 selects a sample x1(n−p) from the second FIFO buffer 352 for input to the second adder/subtractor 358. The third selector 356 provides the other input to the adder/subtractor 358. When the third selector 356 is set to "1", the sample x1(n) is input to the second adder/subtractor 358. When the second adder/subtractor 358 is configured to subtract, the result is the second derivative x2(n)=x1(n)−x1(n−p). When the sample spacing indices m=1 and p=1, the resulting x2(n) is the second derivative over adjacent samples. The fourth selector 362 may select the alternative using the fewest bits for the previous packet and provide the respective sample x(n), x1(n) or x2(n) to the block floating point encoder 400. The FIFO buffers 344 and 352 store N and M samples, respectively. The sizes N and M may be set to accommodate compression calculations for a range of data formats.

The block 360 includes logic to determine which of alternatives x(n), x1(n) or x2(n) for the current packet would produce the least number of bits, or most compression, for a compressed packet. A selection parameter corresponding to the alternative with the most compression is provided to the fourth selector 362 and stored in the packet header of the next packet. The selector 362 applies the selection parameter to samples for the next packet. Determining the selection for the next packet based on the current packet data reduces the latency of compression processing. Alternatively, the selection parameter may be based on the current packet data and stored in the current compressed packet, if the latency to determine the minimum bits per packet is tolerable. Alternatively, the selection of x(n), x1(n) or x2(n) may be made during a training period and fixed for subsequent packets. Alternatively, the selector 362 may use a manually-set selection parameter received from the compression controller 600. When the compression processing uses the block floating point encoder 400, the block 360 logic may determine which of the alternatives x(n), x1(n) and x2(n) produces the most compression as follows:

1) For each ith block of N_GROUP samples for a packet, determine the maximum exponent (base 2), or n_exp(i) for each alternative x(n), x1(n) and x2(n), 2) Sum the n_exp(i) for all the blocks for a packet to form a total for each alternative, and 3) Select the alternative corresponding to the lowest total.

While the above may not explicitly calculate the exact number of bits per compressed packet for each alternative, the alternative producing the best compression is indicated by the lowest total. Alternatively, the maximum magnitude sample, max(i), in each block N_GROUP samples for each alternative can be substituted for n_exp(i).

The adaptive compressor supports compression of multi-dimensional data structures or multiplexed data structures. Certain parameter settings for the components in FIG. 11 are appropriate for compression for two-dimensional (2D) data, such as image samples. For example, let N equal the number of samples representing a row of a 2D data set (or an image) so that a sequence of the integer samples x(n) represents row-ordered samples of two or more rows of the 2D data set, where x(0) to x(N−1) is the first row, x(N) to x(2N−1) is the second row, etc. When the first selector 346 is set to select x(N) and the first adder/subtractor 348 is configured to subtract, the resulting x1(n)=x(n) −x(n−N) is the difference between corresponding samples in adjacent rows. When the second selector 354 is set to select "1", the third selector 356 is set to select "0", and the second adder/subtractor 358 is configured to subtract, the resulting x2(n)=x(n)−x(n−1) is the sample difference within the same row. The fourth selector 362 would select the input sample x(n), the row difference sample x1(n), or the sample difference x2(n) for block floating point encoding. The parameters H_DIM and V_DIM in the descriptor represent the number of pixels per raster (row) and number of rasters (rows) per frame.

For multiplexed data, a sequence of samples x(n) may represent multiple channels of data, such as data from multiple sensors, multiplexed together to form the sequence. For example, N may represent the number of multiplexed channels, where x(n) to x(n−N+1) represent one sample from each channel at a given time instant and x(n−N) represents two temporally consecutive samples from the same channel. When the first selector 346 is set to select x(n−N) and the first adder/subtractor 348 is configured to subtract, the resulting x1(n)=x(n)−x(n−N) is the difference between temporally consecutive samples from the same data channel. When the second selector 354 selects samples from a second channel offset from the first channel and the second adder/subtractor 358 is configured to subtract, the difference x2(n)=x(n)−x(n−p) is the difference between two different channels at a given time instant. The difference between channel data may provide compression when the different channels are correlated. The selector 362 would select the input sample x(n), the intra-channel difference x1(n), or the inter-channel difference x2(n) for block floating point encoding.

The adaptive compressor supports compression of data having different center frequencies. As described in the '533 patent, the sample separations and the addition or subtraction operations may be selected to optimally compress the samples based on their center frequency. The pre-processor 330 may include a center frequency detector to determine the center frequency. Techniques for center frequency detection are described in the '533 patent. The center frequency is indicated as a fraction of the sample rate SR. The sample separation parameter may be used by selectors 346 and 354. The selection parameter for the third selector 356 is set to "1" for calculating second order derivatives. The add/subtract configurations apply to both adder/subtractors 348 and 358. The selection of addition or subtraction is related to the positive or negative correlation of the samples separated by the sample separation parameter corresponding to the center frequency.

The fourth selector 362 makes selections of x(n) or x1(n) to initialize the data for the compressed packet. For initialization, the fourth selector 362 may select the sample x(n) for absolute encoding as the initial sample of the compressed packet. Thus, when the first derivatives or differences x1(n) are to be encoded for a particular compressed packet, at least the initial sample for the packet will be the absolutely encoded x(n). When the second derivatives x2(n) are to be encoded for a particular compressed packet, the fourth selector 362 may select the sample x(n) for the initial sample and the first derivative x1(n) for the second sample of the compressed packet. This initialization may be performed at least once per compressed packet.

The compression controller 600 may provide the parameters for the components of the adaptive compressor architecture, including an attenuation factor for the attenuator 332, the sample separation parameter for the selectors 346 and 354, add/subtract selection parameter for the adder/subtractors 348 and 358 and selection parameter for the third selector 356. The compression controller may store configuration parameters corresponding to multiple data structures in memory. When a particular data structure is to be compressed, the compression controller 600 may retrieve the appropriate parameters and provide them to the corresponding components of the adaptive compressor. Data structure information may include, for example, multidimensional data parameters, multiplexed data parameters or image data parameters such as H_DIM and V_DIM. The compression controller may receive information on center frequency, for example, from a center frequency detector and select the corresponding parameters for the components of the adaptive compressor, as described in the '533 patent.

Referring to FIGS. 9 and 1, the control parameter STRIDE1 refers to the sample separation used by the selector 346 to select the sample x(n−m) from the FIFO buffer 344. The control parameter STRIDE2 refers to the sample separation used by the second selector 354 to selects a sample x1(n−p) from the second FIFO buffer 352. The control parameter ADD_SUB indicates the operation performed by the adder/subtractor elements 348 and 358. The control parameter DERIV indicates the selection of x(n), x1(n) or x2(n) by the selector 362. The controller 2210 may provide these control parameters to the redundancy remover 2214 and the header generator 2212. The DERIV parameter may be set by the descriptor or determined during compression processing, as described with respect to FIG. 11. The header generator 2210 may encode some of the control parameters for the header section of the compressed data packet.

Figure 12:
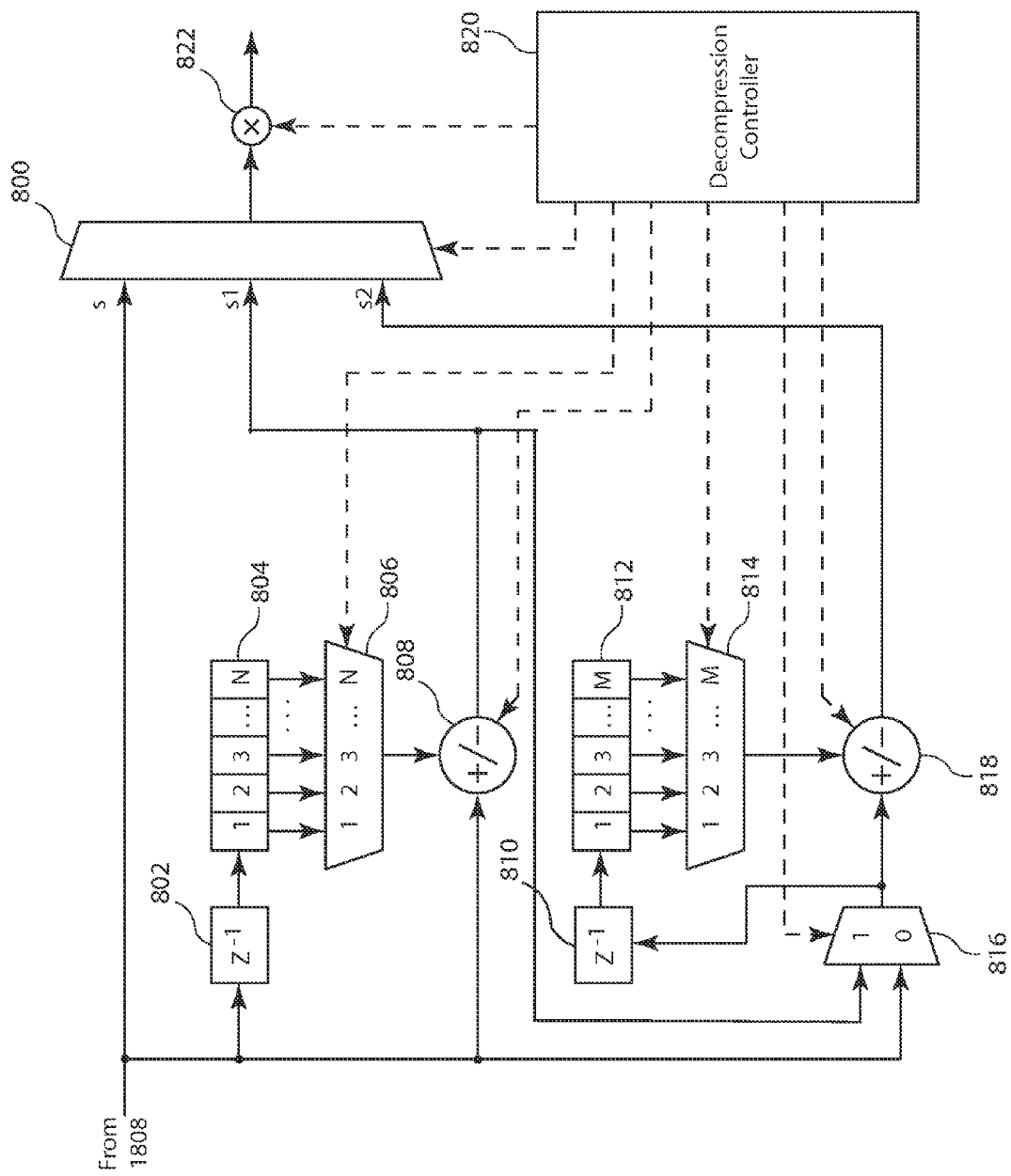
FIG. 12 illustrates an adaptive architecture for the signal regenerator of FIG. 10, as used in one example system for integer decompression.

Components of the decompressor 2200 are described in the following. FIG. 12 illustrates an adaptive architecture for the signal regenerator 1810 of FIG. 10, as used in one example system for integer decompression. The decompression controller 1804 of FIG. 10 may include the functionality of the decompression controller 820 of FIG. 12. The input to the bit unpacker 1808 applies block floating point decoding to provide decoded samples to the adaptive decompressor. The adaptive decompressor performs sums or differences between decoded samples separated by selectable sample spacings to invert the compression operations. For the following description, the variable s(n) represents a decoded sample output from the BFP decoder of the bit unpacker 1808. The FIFO buffer 804 stores N previous samples s(n−1) to s(n−N), where the delay element 802 provides s(n−1). The selector 806 selects a sample s(n−m) with the desired sample separation from the FIFO buffer 804. The add/subtract element 808 computes the sum or difference between the current decoded sample s(n) and the selected sample s(n−m) to form a first result s1(n). If add/subtract element 808 is configured to add, the result s1(n) represents a first integral s1(n)=s(n)+s(n−m). When the sample spacing index m=1, the result s1(n) is the first integral of adjacent decoded samples. When the third selector 816 is set to "1", the first result s1(n) is delayed by a second delay element 810 to form s1(n−1) and provided to a second FIFO buffer 812. The second FIFO buffer 812 may store up to M samples of s1 from s1(n−1) to s1(n−M). The second selector 814 selects a sample s1(n−p) from the second FIFO buffer 812 for input to the second adder/subtractor 818.

The third selector 816 provides the other input to the adder/subtractor 818. When the third selector 816 is set to "1", the sample s1(n) is input to the second adder/subtractor 818. When the second adder/subtractor 818 is configured to add, the result is the second integral s2(n)=s1(n)+s1(n−p). When the sample spacing indices m=1 and p=1, the resulting s2(n) is the second integral over adjacent decoded samples. The fourth selector 800 selects the sample s(n), s1(n) or s2(n) indicated by the corresponding decompression parameter and provides the selected sample to the multiplier 822. The multiplier 822 multiplies the selected sample by a gain factor to invert the attenuation factor applied by attenuator 332. Since applying the attenuator 332 produced lossy compression, multiplication by the gain factor will produce an approximation of original sample value. If attenuation was not applied during compression, the gain factor for multiplier 822 is set to "1" or the multiplier is bypassed. The decompression controller 820 may determine the gain factor based on attenuation information (ATTEN) extracted from the compressed packet header. The FIFO buffers 804 and 812 store N and M samples, respectively, to accommodate different data structures, as described above for the integer compression logic 304.

The adaptive decompressor architecture supports decompression of multidimensional data structures or multiplexed data structures using parameter settings described with respect to the adaptive compressor architecture of FIG. 11. For the 2D data set example, where N equals the number of samples representing a row of a 2D data set (or an image), the first selector 806 is set to select s(N) and the first adder/subtractor 808 is configured to add, the resulting s1(n)=s(n)+s(n−N) sums the decoded samples to reverse the difference operation of adjacent rows performed for compression. When the second selector 814 is set to select "1", the third selector 816 is set to select "0", and the second adder/subtractor 818 is configured to add, the resulting s2(n)=s(n)+s(n−1) sums decoded samples to reverse the difference operation of samples within the same row performed for compression. For the multiplexed data example described above, N represents the number of multiplexed channels. When the first selector 806 is set to select s(n−N) and the first adder/subtractor 808 is configured to add, the resulting s1(n)=s(n)+s(n−N) reverses the difference between temporally consecutive samples from the same data channel performed for compression. When the second selector 814 selects samples from the second channel offset from the first channel and the second adder/subtractor 818 is configured to add, the difference s2(n)=s(n)+s(n−p) reverses the difference between two different channels performed for compression. The fourth selector 800 selects from s(n), s1(n) or s2(n) based on the compression parameter from the compressed packet header.

The adaptive decompressor architecture supports decompression of data having different center frequencies. The selectors 806 and 814 select sample spacing and the addition or subtraction operations to reverse the operations performed by the adaptive compressor the samples based on their center frequency. The selection parameter for the third selector 816 is set to "1" for calculating second order integrals. The configurations of the adder/subtractors 808 and 818 reverse the operations of the adder/subtractors 348 and 358.

The fourth selector 800 makes selections of s(n) or s1(n) corresponding to the initialized data of the compressed packet. When the first derivatives or differences x1(n) were encoded for a particular compressed packet, at least the initial sample for the packet will be absolutely encoded. For the initial decoded sample from the compressed packet, the fourth selector 800 may select s(n) as the initial sample. The fourth selector 800 would select the first integral s1(n) for the remaining decoded samples from the compressed packet. When the second derivatives x2(n) were encoded for a particular compressed packet, the fourth selector 800 may select the sample s(n) for the initial sample and the first integral s1(n) for the second sample, and the second integral s2(n) for the remaining decoded samples from the compressed packet. This initialization may be performed at least once for decoded samples from a compressed packet, depending on the initialization performed during compression.

The decompression controller 820 may provide the decompression parameters for the components of the adaptive decompressor, including the gain factor for the multiplier 822, the sample separation parameters for the selectors 806 and 814, add/subtract configuration parameters for the adder/subtractors 808 and 818 and selection parameters for the selectors 816 and 800. The decompression controller 820 may determine the decompression parameters based on the compression parameters extracted from the compressed data packet header. For example, the gain factor may be generated using a lookup table based on the control parameter ATTEN retrieved from the compressed packet header. The samples separation parameters STRIDE1 and STRIDE2 apply to the selectors 806 and 814, respectively. The ADD_SUB parameter configures the adder/subtractor elements 808 and 818. The DERIV parameter determines the selection of s(n), s1(n) or s2(n) by the selector 800.

Referring to FIG. 10, the floating point post-processor 1814 may apply integer to float format conversion to the decompressed integer samples output from the signal regenerator 1810 to the reconstruct the floating-point data. A first alternative for integer to float format conversion corresponds to the float to integer format converter that uses the F_SCALE factor. This integer to float format conversion implements the following:

$$fp\_samp = int\_samp / F\_SCALE$$

where, "fp_samp" indicates the reconstructed floating-point sample and "int_samp" indicates the decompressed integer sample output from the signal regenerator 1810.

A second embodiment for an integer to float format conversion corresponds to the second embodiment of float to integer format conversion described above. Each input sample comprises the sign and the decompressed integer mantissa in a two's-complement format. An inverter is applied to the decompressed integer mantissa and "1" is added to the inverted mantissa to produce the mantissa, neg_mant, for a negative number. The decompressed integer mantissa provides the mantissa, pos_mant, for a positive number. A selector responds to the sign value to select pos_mant if the sign value is "0" or neg_mant if the sign value is "1". The bit position of the most significant "1" in the decompressed integer mantissa is determined, which is the leftmost nonzero bit that is not a sign extension bit. The bit position, b, is used to determine a left-shift value e_shift by, $$e\_shift = Nbits - 1 - b$$

To reconstruct the mantissa, the selected mantissa left-shifted based on the left-shift value e_shift and the hidden bit is cleared. For the IEEE 754 standard, the reconstructed mantissa would have 23 bits for single precision or 52 bits for double precision. To reconstruct the exponent, the adder 842 computes the difference of e_shift and EXP_SCALE. For the IEEE 754 standard, the reconstructed exponent would have 8 bits for single precision or 11 bits for double precision. Alternatively, when the original floating-point number was scaled by F_SCALE, the EXP_SCALE value is not used. In this case, the e_shift provides the exponent value, exp, and the reconstructed floating-number is divided by F_SCALE. Preferably, the F_SCALE or EXP_SCALE parameter is retrieved from the packet header of the compressed data packet.

Some of the parameters for the compression modes described above may be provided in the descriptor. Other parameters may be contained in the packet header of the compressed data packet. For the compression descriptor, the parameters may include:

D_TYPE: Datatype parameters, including indicators for data formats uint, int, float, RGB, YUV, Bayer matrix, bits per sample, color space conversion, YUV color space decimation MODE: Compression mode parameter including indicators for copy mode (no compression), lossless compression, lossy compression, fixed output bit rate, fixed output quality N_FIFO: corresponds to N in FIGS. 11 and 12.

RR_STRIDE2: corresponds to the sample separation parameter for the selector 354 (FIG. 11) and the selector 814 (FIG. 12).

RR_MANUAL_STRIDE1: corresponds to a manual setting for the sample separation parameter for the selector 346 (FIG. 11) and the selector 806 (FIG. 12).

RR_MANUAL_ADD_SUB: corresponds to manual settings for the add/subtract elements 348 and 358 (FIG. 11) and the add/subtract elements 808 and 818 (FIG. 12).

RR_MANUAL_DERIV: corresponds to a manual setting of the selection parameter for the selector 362 (FIG. 11) and selector 800 (FIG. 12).

RR_AUTO_MANUAL: corresponds to providing automatic or manual settings for three parameters: sample separation parameter STRIDE1 for the selector 346 (FIG. 11) and the selector 806 (FIG. 12), ADD_SUB settings for the add/subtract elements 348 and 358 (FIG. 11) and the add/subtract elements 808 and 818 (FIG. 12), and DERIV selection parameter for the selector 362 (FIG. 11) and selector 800 (FIG. 12).

ATTEN: corresponds to the attenuation factor for the attenuator 332 in FIG. 11.

The datatype parameters support the different formats of application data provided by application accelerator processors 104-1 to 104-N. The compression mode alternatives may include no compression, lossless and lossy modes. For the lossless mode, compression and decompression regenerate an exact copy of the original data. For the lossy mode, compression and decompression produce an approximation the original data. If the parameters are fixed for the compression operations, the same descriptor may be used by the encoder 110 and the decoder 112. In some compression modes, some of the parameters are modified or learned during compression operations. For this case, the decompression descriptor contains a subset of the parameters in the compression descriptor. For example, the decompression descriptor may include only unchanged parameters, such as the datatype indicator D_TYPE. The packet header of the compressed data packet may include parameters that were determined during compression operations or that were not specified in the descriptor. The parameters may include:

ATTEN: corresponds to the attenuation factor for the attenuator 332 in FIG. 11.

STRIDE1: corresponds to the sample separation parameter for the selector 346 (FIG. 11) and the selector 806 (FIG. 12).

ADD_SUB: corresponds to settings for the add/subtract elements 348 and 358 (FIG. 11) and the add/subtract elements 808 and 818 (FIG. 12).

DERIV: corresponds to the selection parameter for the selector 362 (FIG. 11) and selector 800 (FIG. 12).

MAX_EXP: corresponds to the EXP_SCALE value used by the floating-point preprocessor 2202 (FIG. 9) and the floating-point postprocessor 1814 (FIG. 11).

One or more descriptors for the application data produced by a given application accelerator processor 104-x may be included in or accessible to the configuration module 128-x of the accelerator driver program 126-x. The configuration module 128-x may include instructions for selecting a descriptor based on various operational modes of the application accelerator processor 104-x.

The accelerator driver 126-x is typically implemented as one or more software (or firmware) programs. The configuration module 128-x can be implemented as additional instructions and data incorporated into the accelerator driver software. The acceleration driver 126-x including the configuration module 128-x may be provided as a computer program product. The computer program can be written in any form of programming language, including compiled or interpreted languages, and it can be deployed in any form, including as a stand-alone program or as a module, component, subroutine, or other unit suitable for use in a computing environment. The computer program product can be tangibly embodied in an information carrier, e.g. in a machine readable storage device or in a propagated signal, for execution by a data processing apparatus, e.g. a programmable processor, processor core of a multicore processor, or a CPU. In a preferred implementation, the computer program for accelerator driver 126-x including the configuration module 128-x is executable by a CPU core of a single or multicore processor.

A preferred architecture for the computing system shown in FIG. 2 is a SoC architecture 130, where logic for the processor cores 102, 104-1 to 104-N, the cache memory controller 108 and the memory controller 118 are integrated in the SoC and the memory controller 118 is connected to an off-chip DDR memory 120. Hardware logic for the cache memory controller 108 may be implemented as an intellectual property (IP) core for a SoC. Referring to FIG. 3, the controller engine 140, encoder 110 and decoder 112 may be implemented as hardware logic blocks. The controller memory 144 and cache memory 114 may be implemented by embedded static random access memories (SRAMs). The TLB 142 may be implemented by a content addressable memory core. Integrated circuit designers determine how many physical encoder logic blocks and decoder logic blocks will be instantiated in their design. Implementations with multiple encoder logic blocks can compress respective portions of the application data in parallel to produce compressed application data at a higher bit rate. The compressed application data can be transferred to the memory 120 at a higher bit rate. Likewise, implementations with multiple decoder logic blocks can receive respective portions of the compressed application data from the memory 120 at a higher bit rate and decompress the respective portions in parallel. It may be desirable for the higher bit rate to be close to the memory bandwidth capacity to optimize efficiency of data transfers to/from the memory 120.

For implementations using FPGA circuits, the technology described here can include a memory storing a machine readable specification of the compression logic, and a machine readable specification of the decompression logic, in the form of a configuration file for the FPGA block. Implementations of the cache memory controller 108, including one or more encoder logic blocks and one or more decoder logic blocks, may be described using computer aided design tools and expressed (or represented), as data and/or instructions embodied in various computer-readable media, in terms of their behavioral, register transfer, logic component, transistor, layout geometry, and/or other characteristics. A machine readable specification of logic blocks for the cache memory controller 108 can be implemented in the form of such behavioral, register transfer, logic component, transistor, layout geometry and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. A memory including computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, netlist generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

We claim:

1. A computer system, comprising:
a central processing unit (CPU) responsive to instructions of a computer program;
a plurality of application accelerator processors in communication with the CPU;
a first memory storing compressed application data and having a plurality of buffers allocated therein;
a memory controller connected to the first memory;
a cache memory; and
a cache memory controller in communication with the CPU, the application accelerator processors, the cache memory, and the memory controller, the cache memory controller including an encoder to compress application data from the application accelerator processors for writes to the first memory and a decoder to decompress compressed application data from reads of the first memory,
wherein the CPU is responsive to instructions to allocate the buffers in the first memory to store the application data provided by respective application accelerator processors and to provide location parameters representing sets of memory addresses allocated for the respective buffers to the cache memory controller, and
wherein the cache memory controller monitors memory addresses specified in respective read requests and write requests to the memory controller.

2. The computer system of claim 1, the cache memory controller further comprising:
a controller engine in communication with the plurality of application accelerator processors, the CPU, the encoder and the decoder; and
a second memory in communication with the controller engine to store descriptors with information associated with the location parameters for the buffers allocated in the first memory, wherein the information includes parameters for the encoder and the decoder, wherein the controller engine selects particular parameters based on the specified memory address and provides the selected parameters to the encoder in response a write request or to the decoder in response to a read request.

3. The computer system of claim 2, wherein the CPU is responsive to an instruction to provide the descriptors to the cache memory controller.

4. The computer system of claim 1, wherein the cache memory controller further comprises a translation lookaside buffer in communication with the controller engine, to store a portion of the memory addresses for compressed application data stored in the first memory corresponding to the portion of the uncompressed application data stored in the cache memory.

5. The computer system of claim 1, wherein the encoder further comprises a plurality of encoder logic blocks to compress respective portions of the application data in parallel and to produce compressed application data at a desired bit rate.

6. The computer system of claim 1, wherein the decoder further comprises a plurality of decoder logic blocks to receive respective portions of the compressed application data at a desired bit rate and to decompress the respective portions in parallel to produce decompressed application data.

7. The computer system of claim 1, wherein the CPU, the at least one application accelerator processor and the cache memory controller are integrated in a system-on-chip.

8. The computer system of claim 7, further comprising a memory controller integrated in the system-on-chip and in communication with the cache memory controller to transfer the compressed application data via a memory interface from the system-on-chip to the first memory, wherein the first memory is located off-chip.

9. The computer system of claim 1, wherein the cache memory controller receives the memory addresses specified by the application accelerator processor in an instruction for direct memory access (DMA) transfer between the application accelerator processor and the first memory.

10. The computer system of claim 2, wherein one of the parameters indicates whether the encoder will compress the application data corresponding to the respective write request.

11. The computer system of claim 2, wherein one of the parameters indicates whether the decoder will decompress the application data corresponding to the respective read request.

12. The computer system of claim 2, wherein one of the parameters indicates one of a set of data compression modes, the set of data compression modes including at least one lossy mode.

13. The computer system of claim 1, wherein one of the application accelerator processors comprises a video codec.

14. The computer system of claim 1, wherein one of the application accelerator processors comprises an image sensor interface.

15. The computer system of claim 1, wherein one of the application accelerator processors comprises a display processor.

16. A method, comprising:
  allocating a plurality of buffers in a first memory to store application data provided by a plurality of application accelerator processors, wherein each buffer provides storage for a particular one of the application accelerator processors;
  receiving at a cache memory controller location parameters representing sets of memory addresses for the plurality of buffers;
  monitoring memory addresses specified by the application accelerator processors in respective read requests and write requests to a memory controller for the first memory;
  compressing the application data in response to a write request to generate compressed application data;
  storing the compressed application data in one allocated buffer of the plurality of buffers in the first memory;
  retrieving the compressed application data from the allocated buffer in the first memory in response to a read request; and
  decompressing the retrieved compressed application data to generate uncompressed application data; and
  storing the uncompressed application data in cache memory controlled by the cache memory controller.

17. The method of claim 16, further comprising storing descriptors with information associated with the location parameters in a second memory of the cache memory controller, wherein the information includes parameters for the compressing and the decompressing.

18. The method of claim 17, further comprising selecting one or more of the parameters based on the specified memory address and the location parameters in response to the respective read requests and write requests.

19. The method of claim 16, further comprising storing a portion of uncompressed application data in the cache memory of the cache memory controller prior to the compressing.

20. The method of claim 19, further comprising storing a portion of the memory addresses for compressed application data stored in the first memory corresponding to the portion of the uncompressed application data stored in the cache memory in a translation lookaside buffer of the cache memory controller.

21. The method of claim 16, wherein the memory addresses specified in respective read requests and write requests are included in an instruction for a direct memory access (DMA) transfer between the application accelerator processor and the first memory.

22. The method of claim 18, further comprising:
  determining whether to apply the compressing based on one of the parameters selected in response to a respective write request; and
  applying the compressing or bypassing the compressing in response to the determining, wherein the storing stores uncompressed application data in the allocated buffer in response to said bypassing.

23. The method of claim 18, further comprising:
  determining whether to apply the decompressing based on one of the parameters selected in response to a respective read request; and
  applying the decompressing or bypassing the decompressing in response to the determining, wherein said retrieving retrieves uncompressed application data from the allocated buffer in response to said bypassing.

24. The method of claim 17, wherein one of the parameters indicates one of a set of data compression modes, the set of data compression modes including at least one lossy mode.

25. The method of claim 16, wherein one of the application accelerator processors comprises a video codec.

26. The method of claim 16, wherein one of the application accelerator processors comprises an image sensor interface.

27. The method of claim 17, wherein one of the application accelerator processors comprises a display processor.

* * * * *